(12) United States Patent
Adriaansen et al.

(10) Patent No.: US 9,971,974 B2
(45) Date of Patent: *May 15, 2018

(54) METHODS AND SYSTEMS FOR KNOWLEDGE DISCOVERY

(71) Applicant: Elsevier, Inc., New York, NY (US)

(72) Inventors: Edwin Adriaansen, Culemborg (NL); Bob J. A. Schijvenaars, Zoeterwoude (NL)

(73) Assignee: Elsevier, Inc., New York, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/247,303

(22) Filed: Aug. 25, 2016

(65) Prior Publication Data

US 2016/0364656 A1    Dec. 15, 2016

Related U.S. Application Data

(60) Continuation of application No. 14/094,688, filed on Dec. 2, 2013, now Pat. No. 9,460,391, which is a division of application No. 12/294,589, filed as application No. PCT/US2007/081410 on Oct. 15, 2007, now Pat. No. 8,600,922.

(Continued)

(51) Int. Cl.
| | |
|---|---|
| *G06F 17/00* | (2006.01) |
| *G06N 5/02* | (2006.01) |
| *G06N 99/00* | (2010.01) |
| *G06N 5/04* | (2006.01) |
| *G06F 17/27* | (2006.01) |
| *G06F 17/30* | (2006.01) |
| *G06F 17/21* | (2006.01) |
| *G06T 11/00* | (2006.01) |
| *G06T 11/20* | (2006.01) |

(52) U.S. Cl.
CPC ......... *G06N 99/005* (2013.01); *G06F 17/218* (2013.01); *G06F 17/27* (2013.01); *G06F 17/274* (2013.01); *G06F 17/2795* (2013.01); *G06F 17/30424* (2013.01); *G06N 5/04* (2013.01); *G06T 11/001* (2013.01); *G06T 11/20* (2013.01)

(58) Field of Classification Search
CPC ......... G06F 17/30867; G06F 17/30905; G06F 17/30749; G06F 17/30864; G06F 17/3053; G06F 17/30554; G06F 17/30761; G06F 17/3082; G06F 17/3084; G06F 17/212; G06F 17/2241; G06F 17/2785; G06F 17/30035
See application file for complete search history.

(56) References Cited

U.S. PATENT DOCUMENTS

| | | |
|---|---|---|
| 6,526,400 B1 | 2/2003 | Takata et al. |
| 6,542,889 B1 | 4/2003 | Aggarwal et al. |

(Continued)

FOREIGN PATENT DOCUMENTS

WO    2007035912    3/2007

OTHER PUBLICATIONS

European Search Report mailed in European Patent Application No. 10775608.2 dated Oct. 1, 2015.

(Continued)

*Primary Examiner* — Luis Sitiriche
(74) *Attorney, Agent, or Firm* — Dinsmore & Shohl LLP

(57) ABSTRACT

Provided are methods and systems for knowledge discovery utilizing knowledge profiles.

18 Claims, 26 Drawing Sheets

Related U.S. Application Data

(60) Provisional application No. 60/829,424, filed on Oct. 13, 2006.

(56) References Cited

U.S. PATENT DOCUMENTS

| | | |
|---|---|---|
| 6,810,376 B1 | 10/2004 | Guan et al. |
| 2002/0128816 A1 | 9/2002 | Haug et al. |
| 2003/0208485 A1* | 11/2003 | Castellanos ....... G06F 17/30648 707/999.005 |
| 2004/0103090 A1 | 5/2004 | Dogl et al. |
| 2006/0053098 A1* | 3/2006 | Gardner ............ G06F 17/30734 707/999.003 |
| 2006/0200556 A1 | 9/2006 | Brave et al. |
| 2008/0140616 A1 | 6/2008 | Encina et al. |

OTHER PUBLICATIONS

Knowledge Discovery in Databases: An Overview, Frawkey et al., AI Magazine vol. 13, No. 3 (1992) (© AAAI).
WO 01/55886 A2; PCT/US01/01944, International Publication Date: Aug. 2, 2001 (Aug. 2, 2001) Cain et al.

\* cited by examiner

FIG. 17

Diseases & Pathologic Processes
▰ Tuberous Sclerosis
▰ Prediabetic State
▰ Androgen-Insensitivity Syndrome

Chemicals & Drugs
▰ Immunoconjugates
▰ Antigens, Differentiation
▰ H-2 Antigens
▰ Isoantigens

Procedures
▰ Gene Therapy
▰ Transplantation, Homologous
▰ Cell Transplantation
▰ Heart Transplantation
▰ Allograft
▰ Liver Transplantation
▰ Histocytochemistry
▰ Chromosome Mapping
▰ Gene Expression Profiling

Anatomy
▰ Liver
▰ Cells
▰ Transplants
▰ Chromosomes, Human, Pair 16
▰ Hepatocytes
▰ Bone Marrow Cells
▰ Heart
▰ Kidney
▰ Hippocampus
▰ Chromosomes, Human, Pair 9
▰ T-Lymphocytes
▰ Suprachiasmatic Nucleus

Molecular Biology
▰ Transgenes
▰ Genes, MHC Class I
▰ Lac Operon
▰ beta-Galactosidase
▰ Genes, Reporter
▰ Genes, Immediate-Early
▰ Gene Expression
▰ Expressed Sequence Tags
▰ Genes, Immunoglobulin
▰ Genes, T-Cell Receptor delta

METHODS AND SYSTEMS FOR KNOWLEDGE DISCOVERY

CROSS REFERENCE TO RELATED PATENT APPLICATION

This application is a continuation of U.S. patent application Ser. No. 14/094,688, filed Dec. 2, 2013 and entitled "METHODS AND SYSTEMS FOR KNOWLEDGE DISCOVERY", which is a division of U.S. patent application Ser. No. 12/294,589, filed Sep. 23, 2009 and entitled "METHODS AND SYSTEMS FOR KNOWLEDGE DISCOVERY", now U.S. Pat. No. 8,600,922, which is a national stage entry of PCT Application No. PCT/US2007/081410, filed Oct. 15, 2007 and entitled "METHODS AND SYSTEMS FOR KNOWLEDGE DISCOVERY", which claims priority to U.S. Provisional Application Ser. No. 60/829,424 filed Oct. 13, 2006 and entitled "Methods and systems for knowledge discovery", the entire contents of each of the foregoing is herein incorporated by reference in their respective entireties.

BACKGROUND OF THE INVENTION

Current textual searching methods utilize keywords. A drawback of these methods is that using the wrong keywords when searching leads to missing out on relevant information. A document that is relevant to the search will not be retrieved if the searched keyword is not used in the document. For instance, the use of the keyword "xenotransplant" during a search, may lead to missing out on references in which the word "xenographic procedure" is used. Additionally, truncation may lead to the search term "xeno" and result in many irrelevant hits.

As a result, the known methods are too slow and inaccurate to provide relevant search results. What is needed is a searching method that retrieves the most relevant documents without relying on keywords.

SUMMARY OF THE INVENTION

In one aspect, provided are methods, systems, and computer readable media for generating, editing, and searching with knowledge profiles. In another aspect, provided are methods, systems, and computer readable media for textual analysis and knowledge discovery.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention:

FIG. 17 illustrates possible query concepts generated from search results.

DETAILED DESCRIPTION OF THE INVENTION

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment.

The present invention may be understood more readily by reference to the following detailed description of preferred embodiments of the invention and the Examples included therein and to the Figures and their previous and following description.

I. Exemplary Operating Environment

Figure 1:
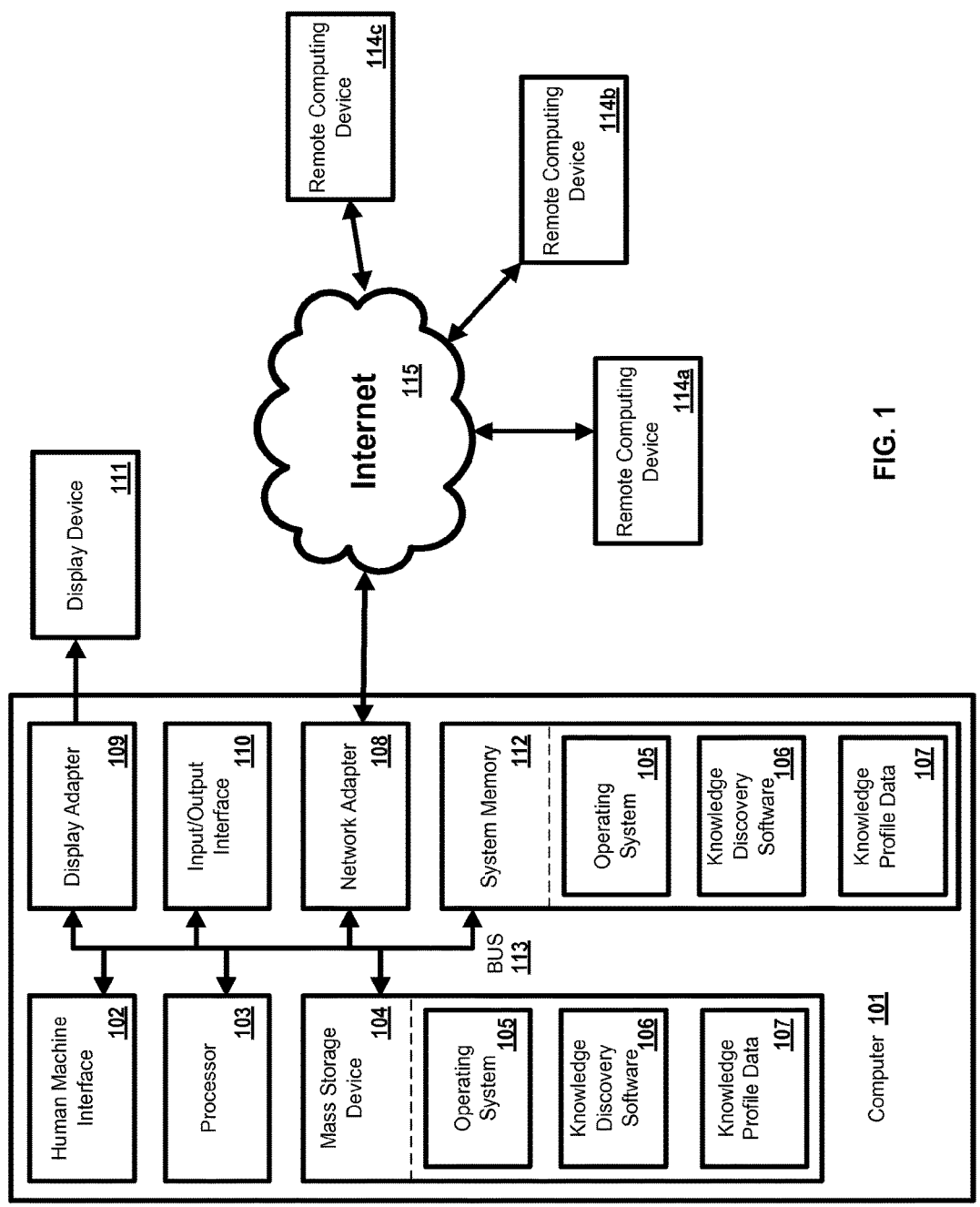
FIG. 1 illustrates an exemplary operating environment.

One skilled in the art will appreciate that provided is a functional description and that the respective functions can be performed by software, hardware, or a combination of software and hardware. FIG. 1 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The system and method of the present invention can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, mini-computers, mainframe computers, distributed computing environments that comprise any of the above systems or devices, and the like.

In another aspect, the processing of the disclosed system and method of the present invention can be performed by software components. The system and method of the present invention can be described in the general context of computer instructions, such as program modules, being executed by a computer. Generally, program modules comprise routines, programs, objects, components, data structures, etc. that perform particular tasks or implement particular abstract data types. The system and method of the present invention can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, Knowledge Discovery software 106, Knowledge Profile data 107, a network adapter 108, system memory 112, an Input/Output Interface 110, a display adapter 109, a display device 111, and a human machine interface 102, can be contained within one or more remote computing devices 114$a,b,c$ at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as Knowledge Profile data 107 and/or program modules such as operating system 105 and Knowledge Discovery software 106 that are immediately accessible to and/or are presently operated on by the processing unit 103.

In another aspect, the computer 101 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and Knowledge Discovery software 106. Each of the operating system 105 and Knowledge Discovery software 106 (or some combination thereof) can comprise elements of the programming and the Knowledge Discovery software 106. Knowledge Profile data 107 can also be stored on the mass storage device 104. It will be appreciated that Knowledge Profile data 107 can be stored in any of one or more databases known in the art. Examples of such databases comprise, DB2®, Microsoft® Access, Microsoft® SQL Server, Oracle®, mySQL, PostgrcSQL, and the like. It is contemplated that the databases can be centralized or distributed across multiple systems.

In another aspect, the user can enter commands and information into the computer 101 via an input device (not shown). Examples of such input devices can comprise, but are not limited to, a keyboard, pointing device (e.g., a "mouse"), a microphone, a joystick, a scanner, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect of the present invention, a display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110.

The computer 101 can operate in a networked environment using logical connections to one or more remote computing devices 114a,b,c. By way of example, a remote computing device can be a personal computer, portable computer, a server, a router, a network computer, a peer device or other common network node, and so on. Logical connections between the computer 101 and a remote computing device 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of Knowledge Discovery software 106 can be stored on or transmitted across some form of computer readable media.

Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is also contemplated that the methods and systems of the present invention can employ Artificial Intelligence techniques such as machine learning and iterative learning Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., expert inference rules generated through a neural network or production rules from statistical learning)

II. Concepts & Thesauri

A. Concepts

In one aspect, validated concepts, and groups of validated concepts, can be concepts compiled by human experts. A concept is a representation of, for example, objects, classes, properties, and relations. The methods and systems provided can distinguish the relations (Broad Term-Narrow Term) that define the relationship between more generic terms and more specific terms (for example, 'animal'-'cow' where animal is the Broad Term and cow is the Narrow Term).

In one aspect, a validated concept can be a description of one or several words. The concepts, the terms that are related to the concepts (preferred term and synonyms) are defined by subject matter experts and therefore relevant to the knowledge field (e.g., Medical, legal, etc.) and validated. Validated concepts, groups of validated concepts, and knowledge profiles, can have or be given an alphanumeric representation, which allows for validated concepts, groups of validated concepts, and knowledge profiles to be rapidly compared and clustered. This selection of an alphanumeric representation for a validated concept, can provide language independence. For example, a knowledge profile (described below) can be generated from an English text and the validated concepts in the English knowledge profile can be searched for in a French thesaurus (a compilation of concepts) by alphanumeric representation to generate a French knowledge profile. In another example, the English knowledge profile can be used to search a collection of French knowledge profiles using alphanumeric representation. In one aspect, the French knowledge profiles can be presented in English, which allows the user to get an impression of the contents of the knowledge sources represented by the knowledge profiles without consulting the knowledge sources in their original language. This allows for language independent knowledge discovery.

B. Thesauri i. Generally

A compilation of validated concepts can be referred to as a thesaurus and represents a field of knowledge or a piece of knowledge. The thesaurus can have top-layer concepts that have related lower, or bottom, layer concepts. For example, in medical science, a disease may have many different names. However, by selecting a name for a specific disease and all different known names for that disease, the problem of missing relevant information because of a failure to use the right keyword is avoided. A group of individually ambivalent words, when they occur together in a piece of information, and particularly when they occur in each other's proximity, can represent a very clearly defined concept.

A thesaurus can be defined by human experts and can be loaded into the system. The thesaurus can be defined in various ways and can comprise the following information: a level number (the top level is 0, more specific level is 1 etc.); a preferred term (which term should be used to communicate with the user); synonym(s) (if synonyms are known they can be added); and a concept number, which is a unique number that is assigned to the concept.

Terms in a thesaurus can be defined as a "default term," wherein the concept will be normalized and the sequence of words in the term may vary. In a further aspect, terms in a thesaurus can be defined as a "not normalized term." Such a "not-normalized" term will not be normalized. This is useful, for instance, when names are part of the term. In yet another aspect, the terms in a thesaurus can be defined as an "exact match term." In this aspect, the words in the exact match term must be found in exactly the same sequence as defined in the thesaurus. This is useful, for example, when symbols like genes or chemical structures are defined in the thesaurus.

ii. Thesaurus Creation

In one aspect, a thesaurus can be represented in a structured datafile. As used herein, thesaurus also refers to meta-thesaurus. In thesauri, concepts are classified according to a hierarchic system of covering or generic concepts with more specific concepts ranked below them. This results in a tree-like structure of higher, covering genus concepts, branching out to more specific, species concepts.

In one aspect, a structured datafile can represent a thesaurus in one or more knowledge fields. To make quick processing possible and to improve recognition of validated concepts, the words in the structured datafile can be normalized words. In this aspect, the information within the generated knowledge profile can be converted into a list of normalized words, after which the normalized words are looked up in the structured datafile.

iii. Homograph Disambiguation

Figure 2:
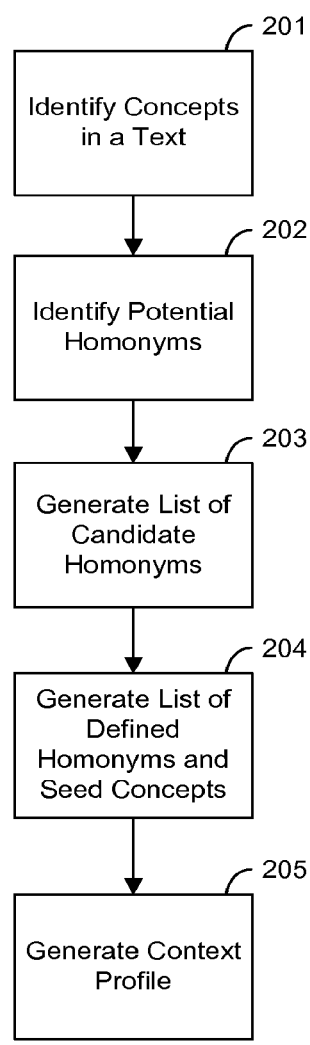
FIG. 2 illustrates an exemplary method for creating context profiles for homograph disambiguation.

A term can refer to multiple concepts. For example, the term "bank" can refer to "the financial institute" or to the "piece of furniture." A term that refers to multiple meanings is called a homograph. As illustrated in FIG. 2 the methods and systems provided can disambiguate homographs by identifying concepts in a text at block 201, identifying potential homographs by comparing preferred terms and synonyms at block 202. If the same term is used more than once in the thesaurus but with different concept numbers, the term, together with the term information like preferred term and Broader Term, can be put into a list of Candidate Homographs at block 203.

This list of Candidate Homographs can be reviewed by a human expert that can distinguish between real homographs and errors made when entering the data of the thesaurus resulting in a list of Defined Homographs. In case of a homograph, the expert can define seed concepts. As used herein, "seed concepts" are concepts that clearly disambiguate the meaning of a term. For example, when the system would come up with "bank" as a homograph, the user can define concepts "money, building, financial institute" as seed concepts for the concept bank as a financial institute and "furniture, to sit" as seed concepts for the concept bank as a piece of furniture to sit on. This process where the human expert defines seed concepts for identified homographs can result in a list of Defined Homographs and Seed Concepts at block 204.

In one aspect, this list of Defined Homographs and Seed Concepts can be provided to the system. The system can determine context concepts for the seed concepts. A context concept can be a concept that serves to further define one definition of a seed concept. For example, if the homograph is "jaguar," the seed concept can be "car" when referring to the vehicle brand and the seed concept can be "animal" when referring to the mammal. Context concepts for "car" and "animal" can be determined. The context concepts for "car" can be, for example, "engine," "top speed," "brakes," etc. The context concepts for "animal" can be, for example, "fur," "carnivore," "Africa," etc. Subsequently, the system can look for documents that contain the homographs with the context concepts.

The system can learn to identify words and concepts that are often mentioned together with one meaning of a homograph but never with the other meaning of the homograph. For example, while reading documents the system can find words and terms like "currency" and "investors" related to the concept bank, the financial institute but never with the concept bank, the furniture. The more often a word or concept is found related to the specific homograph, the stronger the disambiguation for this word or concept. The list of all words and concepts that can be used for disambiguation of a homograph can be stored together with an associated strength (frequency) of disambiguation as a 'context profile' at block 205. This context profile can be used later by the Thesaurus Component to disambiguate homographs.

Figure 3:
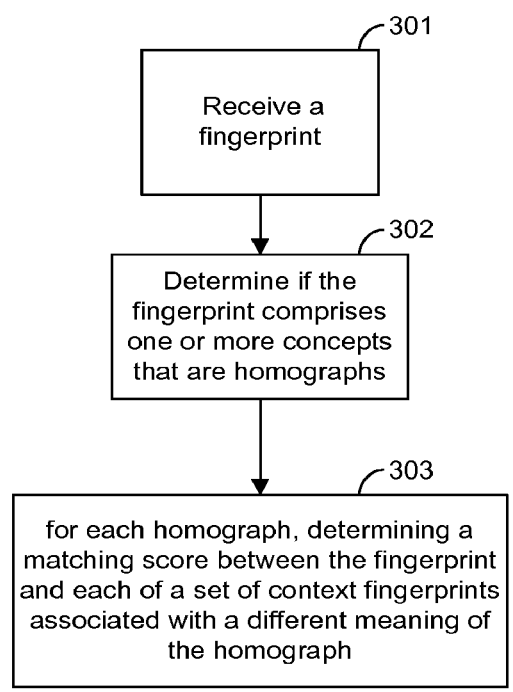
FIG. 3 illustrates an exemplary method for homograph disambiguation.

In one aspect, illustrated in FIG. 3, provided are methods for homograph disambiguation comprising receiving a fingerprint at 301, determining if the fingerprint comprises one or more concepts that are homographs at 302, and for each homograph, determining a matching score between the fingerprint and each of a set of context fingerprints associated with a different meaning of the homograph at 303, wherein a meaning of the homograph is selected from the set of context fingerprints by choosing the context fingerprint with a maximum matching score if that score is above a threshold.

The fingerprint can be a list of concepts and their associated relevance weights. As noted above, a homograph can be one of a group of words that share the same spelling but have different meanings A context fingerprint can be a list of concepts and their associated relevance weights that is constructed based on co-occurrence of concepts in documents with the concept the context fingerprint is created for. In one aspect, determining a matching score can comprise performing a matching algorithm. In another aspect, performing a matching algorithm can comprise storing each context fingerprint as a vector and performing a vector matching algorithm.

Figure 4:
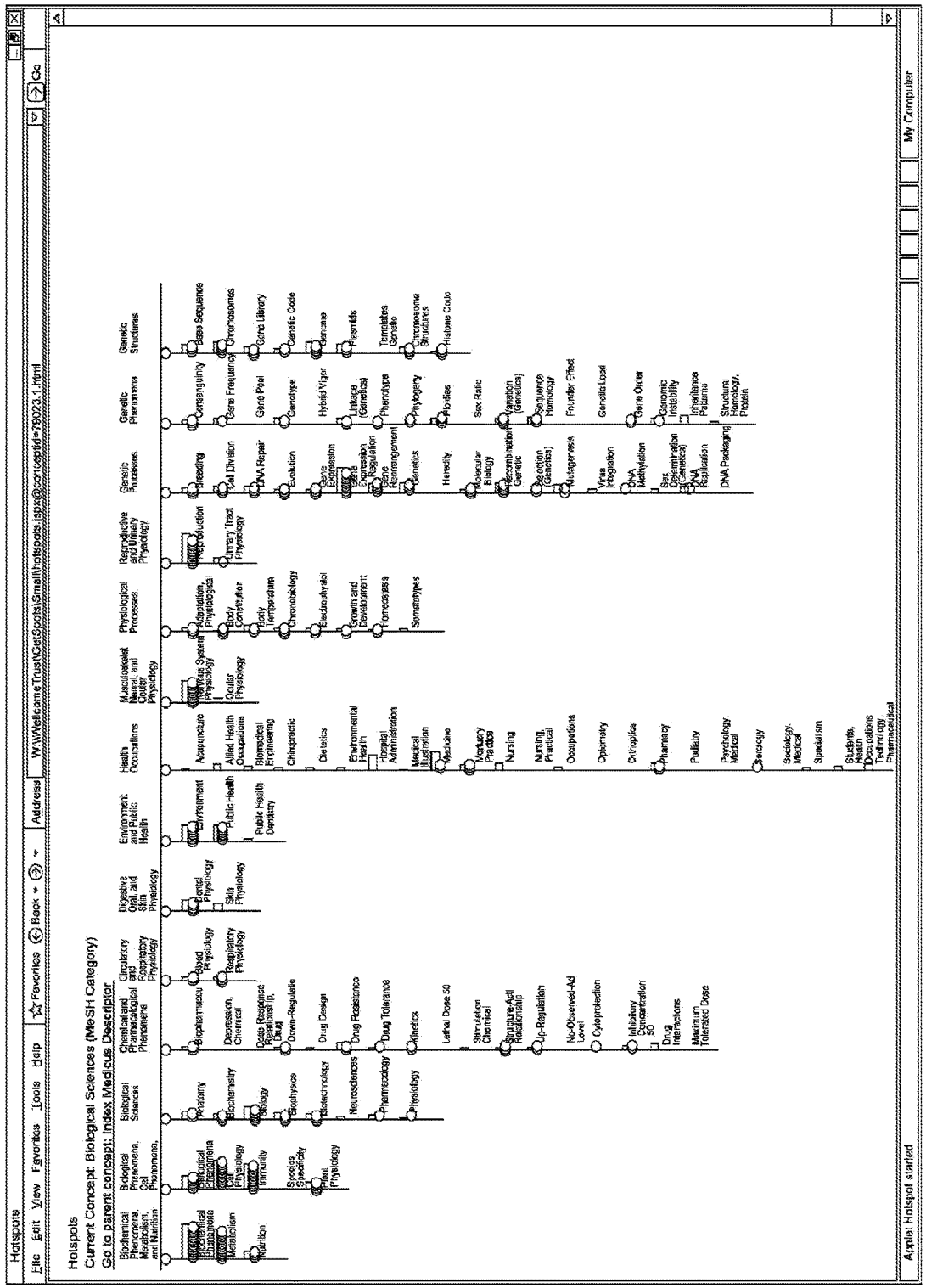
FIG. 4 illustrates exemplary concepts plotted on a display device.

In one exemplary aspect, as illustrated in FIG. 4, concepts from a selected set of documents (for example, a defined category) can be plotted on a derived thesaurus. Each level of the thesaurus can be drawn as a line with nodes for every concept. For example, starting with level 1 the thesaurus can have, for instance, eight concepts within this level, which can be schematically shown as a line containing eight nodes. Each of these level 1 concepts can have sibling within a narrower level 2. This means that a line can be drawn for each concept with level 2 as a narrowed term of level 1 (for each level 1 concept). Each level 2 concept can have one or more level 3 concepts, and so on . . . . This results in a nodal map.

Figure 5:
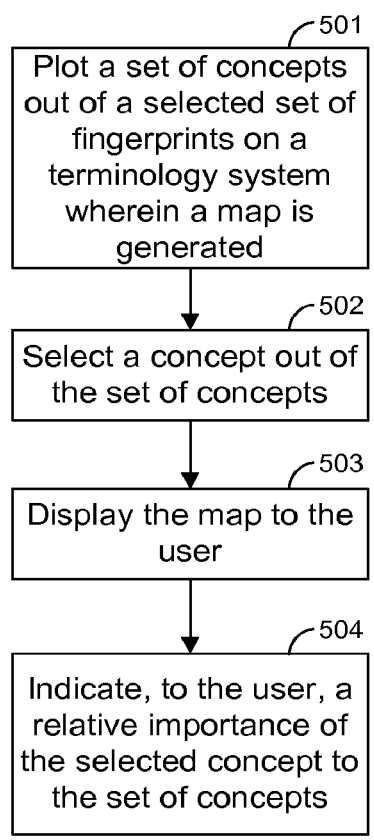
FIG. 5 illustrates an exemplary method for knowledge discovery.

In one aspect, illustrated in FIG. 5, provided are methods for knowledge discovery comprising: plotting a set of concepts out of a selected set of fingerprints on a terminology system; generating a map at 501; selecting a concept out of the set of concepts at 502; displaying the map to the user at 503; and indicating, to the user, a relative importance of the selected concept to the set of concepts at 504. For example, each fingerprint can represent a document, a person, an organization, or a combination thereof. In another aspect, indicating the relative importance of the selected concept to the set of concepts to the user can comprise displaying the selected concept in a different color than that of the other concepts. In yet another exemplary aspect, indicating to the user the relative importance of the selected concept to the set of concepts can comprise displaying the selected concept with an object larger than that of the other concepts.

In one exemplary aspect, an analysis of the documents can provide a set of most frequently used concepts. The set of most frequently used concepts can be plotted as dots in the nodal map. For example, the more often the concept is used can be shown graphically, i.e., the more it is used, the larger the dot is, or the dots change color (from green to red, for example). The methods of the present invention thereby provide instant insight into which areas of a specific domain are represented in a corpus of documents.

iv. Thesaurus Updates

As one would appreciate, if a thesaurus is updated, the previously generated knowledge profiles in the catalog will not necessarily be the most accurate. Some, but generally not all of the knowledge profiles would need to be updated to reflect the updated terminology. In this aspect, a full text word based index of the contents of the catalog can be performed to determine which documents need to have their knowledge profiles updated. This process can identify the concepts and its synonyms that have been added to the thesaurus in the catalog by exploiting a word based index and identifying the documents that are affected. Thus, the knowledge profile re-generation cycle can be shortened after a thesaurus update.

Figure 6:
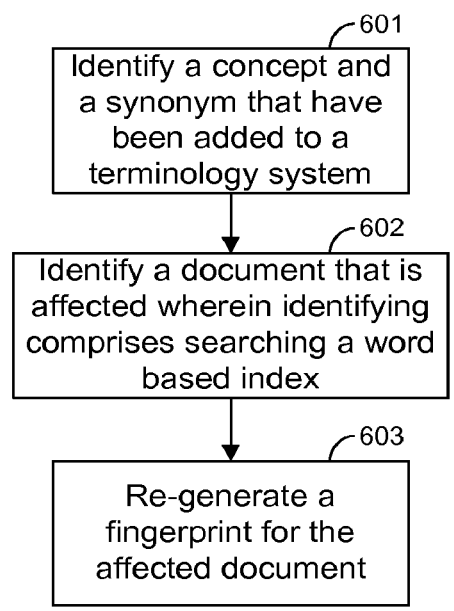
FIG. 6 illustrates an exemplary method for re-generating a fingerprint.

In one aspect, illustrated in FIG. 6, provided are methods for re-generating a fingerprint comprising identifying a concept and a synonym that have been added to a terminology system at 601, identifying a document that is affected wherein identifying comprises searching a word based index at 602, and re-generating a fingerprint for the affected document at 603. In one aspect, the terminology system is a thesaurus. The word based index can comprise a list of words and documents containing each word. The methods can similarly be performed for deleting and/or modifying a concept and a synonym in a terminology system.

III. Knowledge Profile (Fingerprint)

A. Generally

A Knowledge Profile is a representation of knowledge that is derived from a text. After eliminating variations in natural language by identifying validated concepts and assigning a weight to each assigned validated concept, the combined list of these validated concepts form the knowledge profile (or fingerprint).

Knowledge profiles can be used as a category definition. Human experts can add concepts, remove concepts or change the weight of concepts in order to optimize the category definition. Knowledge profiles that match with the category definition with a specific minimum rank, the threshold, are assigned to the category.

B. Knowledge Profile Creation

Cataloging, as used herein, can encompass defining the knowledge contents of a piece of information by means of a knowledge profile (or unique fingerprint) and storing the knowledge profiles in a catalog, also referred to as a collexion. In this aspect, the knowledge profile can comprise validated concepts and can represent one or more pieces of information.

In one aspect multiple knowledge profiles can be generated for a given piece of information. This allows a user to have different domain views (e.g., Medical, Information and Communications Technology ("ICT"), and the like) of one document. These different knowledge profiles can be used in singularly or in combination for matching with a query or other document fingerprints. In a further aspect, the user can define the importance of a knowledge profile compared to the other knowledge profiles by assigning percentages to them. For example, setting a medical knowledge profile to 60% and an ICT knowledge profile to 40% will result in a match where the medical knowledge profile is of more value compared to the ICT knowledge profile.

Figure 7:
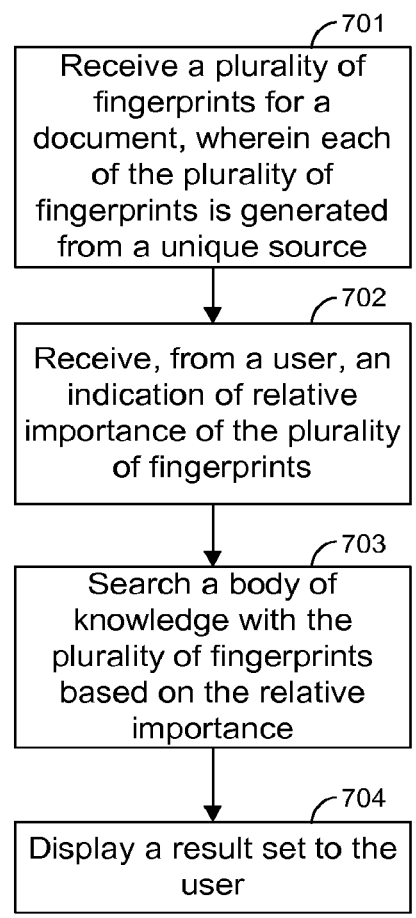
FIG. 7 illustrates an exemplary method for knowledge discovery.

In another aspect, illustrated in FIG. 7, provided are methods for knowledge discovery comprising receiving a plurality of fingerprints for a document, wherein each of the plurality of fingerprints is generated from a unique source at 701, receiving, from a user, an indication of relative importance of the plurality of fingerprints at 702, searching a body of knowledge with the plurality of fingerprints based on the relative importance at 703, and displaying a result set to the user at 704.

Each of the plurality of fingerprints can be a list of concepts and their associated relevance weight. The unique source can comprise a freetext thesaurus, a terminology system, and combinations thereof. The unique source can comprise a combination of unique sources, for example a freetext thesaurus and a terminology system. A freetext thesaurus can be a list of all the words that have been found in a text. The freetext thesaurus is not created upfront by domain experts. New words can be added to the freetext thesaurus while indexing a text and new words can be found. In some aspects, a freetext thesaurus can be considered a terminology system.

One of the plurality of fingerprints can be generated from a first terminology system and another one of the plurality of fingerprints can be generated from a second terminology system. The first terminology system and the second terminology system can be from different technical fields. The plurality of fingerprints can each correspond to a different part of a document. It is contemplated that the body of knowledge can be a collection of fingerprints.

In an additional aspect, the potential relationships between concepts that have never been mentioned together in the same document, which therefore have no co-occurrence, can be predicted by using generated knowledge profiles. These predicted relationships can be achieved by creating a context fingerprint of each concept present within a terminology system of a specific domain. Herein, a context fingerprint can be defined as a list of concepts and their associated relevance weight, which is constructed based on co-occurrence of concepts in the indexed documents with the concept the context fingerprint is created for. Having a context fingerprint for each concept enables a distance calculation to be performed between these concepts even when these concepts themselves do not co-occur in one document. The distance can be calculated, for example, using the cosines or other vector matching algorithms described herein (for example, Jaccard, Dice, and the like) between the context fingerprint of concept 1 and the context fingerprint of concept 2. When the determined distance is small, both concepts have a lot of context concepts in common. In this aspect, the seed concepts that do not have co-occurrence in a cataloged corpus of documents but have a high degree of overlap of context concepts can have a potential relationship.

In a further aspect, the knowledge profiles of different documents can be added up and averaged to generate a new knowledge profile based on a common concept amongst the various knowledge profiles. For example, the knowledge profiles of all documents of a single author can be added up and averaged, thus creating an expertise knowledge profile of a person. In a further example, all of the expertise knowledge profiles of a group of persons are added up and averaged to create a knowledge profile of a company, research group or other functional or organizational entity. Optionally, the root mean square can be used to create an expertise knowledge profile of a person.

Figure 8:
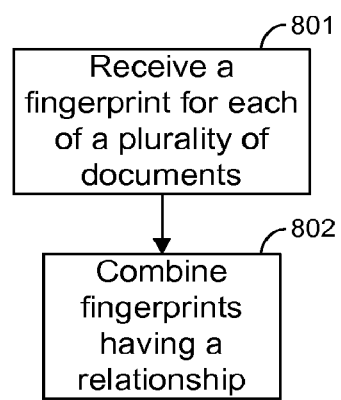
FIG. 8 illustrates an exemplary method for textual analysis.

In a further aspect and as illustrated in FIG. 8, provided are methods for textual analysis comprising receiving a fingerprint for each of a plurality of documents at 801 and combining fingerprints having a relationship at 802. The fingerprint can be a list of concepts and their associated relevance weights. In one aspect, combining fingerprints having a relationship can comprise averaging the fingerprints. Combining fingerprints having a relationship can comprise taking a square of the associated relevance weights, averaging the squares of the weights, and taking the root of the averages. The relationship can comprise at least one of, stems from the same author, published in the same publication, contains the same concept, stems from the same organization, or combinations thereof.

Figure 9:
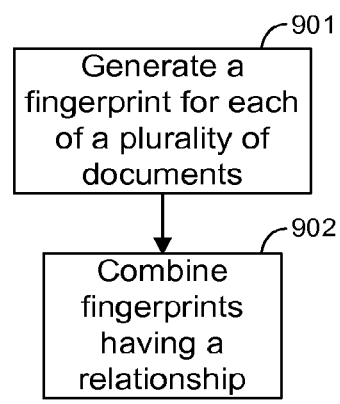
FIG. 9 illustrates another exemplary method for textual analysis.

In yet another aspect, illustrated in FIG. 9, provided are methods for textual analysis comprising generating a fingerprint for each of a plurality of documents at 901 and combining fingerprints having a relationship at 902. The fingerprint can be a list of concepts and their associated relevance weights. Combining fingerprints having a relationship can comprise averaging the fingerprints. Combining fingerprints having a relationship can exemplarily comprise taking a square of the associated relevance weights, averaging the squares of the weights, and taking the root of the averages. For example, the relationship can comprise at least one of, stems from the same author, published in the same publication, contains the same concept, stems from the same organization, or combinations thereof.

i. Concept Identification

Figure 10:
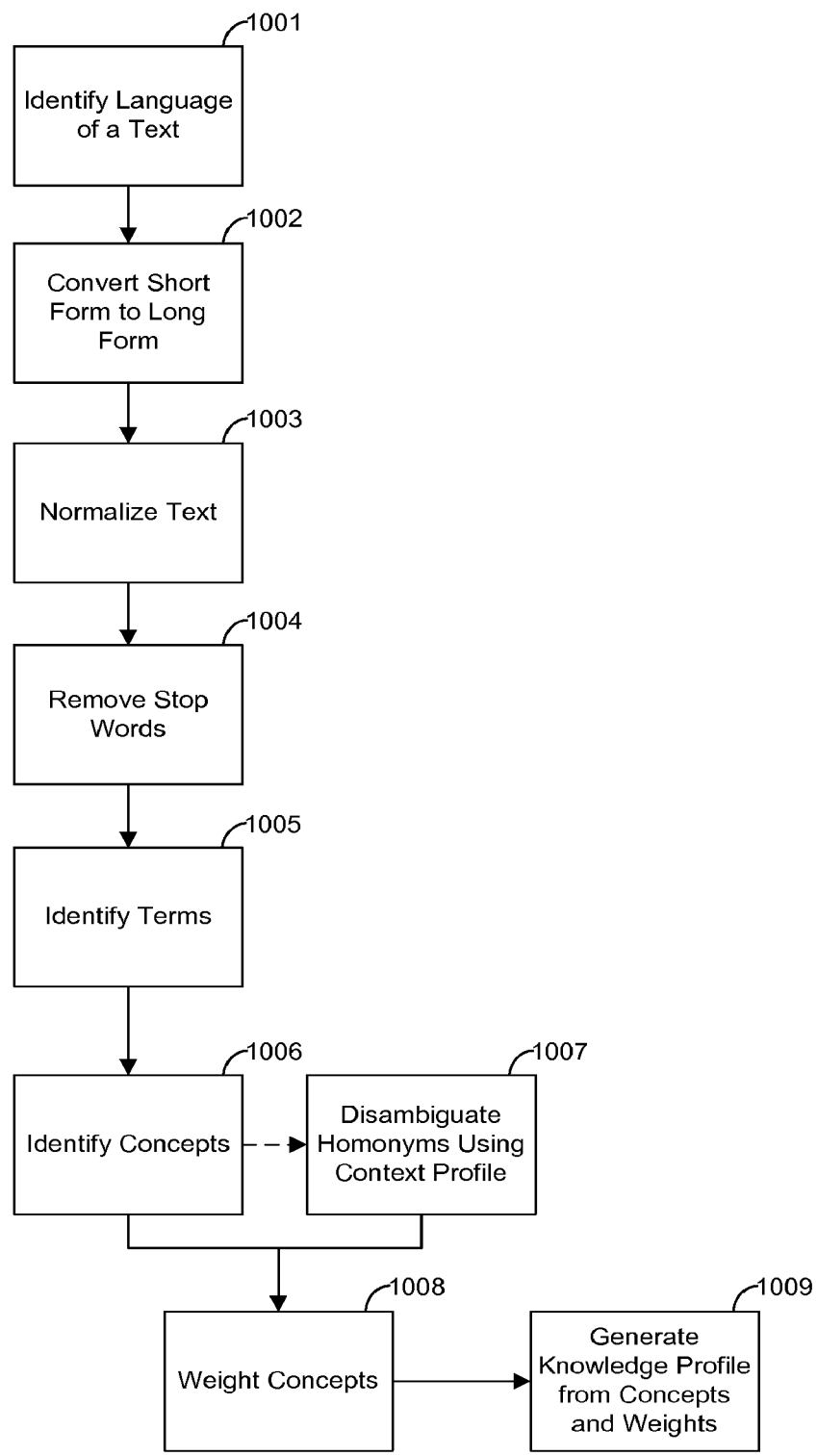
FIG. 10 illustrates an exemplary method for searching with knowledge profiles.

Various sources can be used to import text into the system. These include, but are not limited to, web files, text stored in databases, text in files, and the like. These files, which are often stored in different formats (e.g., Microsoft Word, Open Document Format, Adobe PDF, and the like), can be converted to plain text without layout. As illustrated in FIG. 10, this text can be processed by the Thesaurus Component that converts a text into a knowledge profile.

The Thesaurus Component can identify the language of the text at block 1001. This can be accomplished by using a list of words that are solely and frequently used in a specific language. In one aspect, the system can select the language that matches most with the words in the text. Each language uses a specific language object to identify sentences. Business rules that are defined per language can determine the end of a sentence. For example: in the English language, when a dot is found followed by a white space followed by a capital character, the dot can be used to identify the end of a sentence. However if the word preceding the dot also starts with a capital, the dot is not an end of sentence.

Abbreviations that are surrounded by brackets and preceded by a long form can be identified. The abbreviations that are found in the text can be replaced with the long form at block 1002. This can improve the identification of concepts and therefore improve the quality of the knowledge profiles. For example, text that reads as: "The National Institute for Economic Development (NIED) is located in Washington. The NIED operates . . . ." can be replaced by text that reads as: "The National Institute for Economic Development (NIED) is located in Washington. The National Institute for Economic Development operates . . . ."

Figure 11:
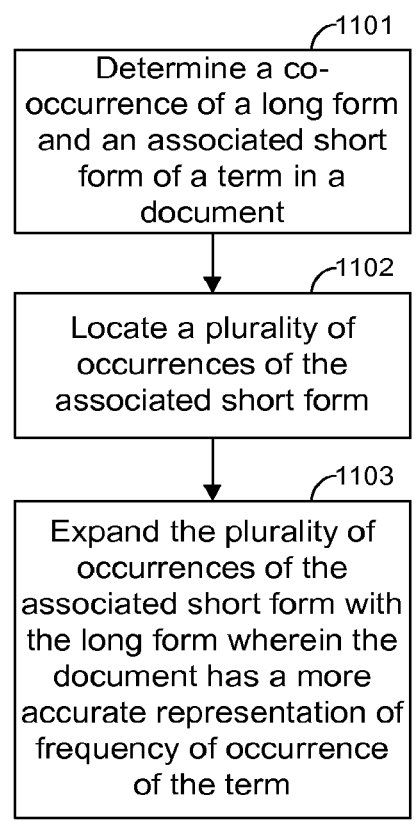
FIG. 11 illustrates another exemplary method for textual analysis.

In one aspect, illustrated in FIG. 11, provided are methods for textual analysis comprising determining a co-occurrence of a long form and an associated short form of a term in a document at 1101, locating a plurality of occurrences of the associated short form at 1102, and expanding the plurality of occurrences of the associated short form with the long form wherein the document has a more accurate representation of frequency of occurrence of the term at 1103.

The long form of the term can comprise at least one word. The associated short form can comprise an abbreviation of the at least one word. The term can represent a concept.

The methods can further comprise determining a frequency of occurrence of the term in the document. The methods can further comprise generating a fingerprint of the document. The methods can further comprise performing steps 1101-1103 for a plurality of documents.

Returning to FIG. 10, the sentence can be normalized, meaning the words in the text are replaced by their root form, at block 1003. Plural nouns can be replaced by singular nouns and variations in verbs can be replaced. Optionally, each sentence can first be processed by a Part of Speech (PoS) tagger. The PoS tagger can identify all possible tags for a word; it can find these tags in a language model database along with an associated likelihood. Using a variety on heuristics, the database can be populated with word-tag-likelihood information. For example, a manual tagged corpus can be used. The likelihood reveals, based on statistics, what the chance is that a specific word is used as specific PoS. For example, "will" as a verb is 80% while "will" like a noun is 20%. For every word, the PoS tagger can check if one of the possible part of speeches is a noun, verb, or adjective. If one of these three is missing, it can be added to a list of possible part of speeches with a low likelihood. This can increase the quality of the tagging since the database is never complete and will most likely miss a verb, noun or adjective.

For each of the possible tags, the PoS tagger can calculate the possibility that a word has a part of speech based on the tags before and after the word. The calculation of the probability can be calculated by supposing there is a sentence to be tagged $W=\{w_1, \ldots, w_n\}$ consisting of n words, and supposing that $T=\{t_1, \ldots, t_M\}$ is the set of M word types (noun, verb, etc.) possible. The maximum probability can be computed as $P_{max}(S)=\max \{P(S)\}$ of a tagging $S=\{s_1, \ldots, s_n\}$, where $s_i \in \{t_1, \ldots, t_M\}$ of sentence W over all possible taggings.

In this aspect, the following information can be exemplarily used. A dictionary that specifics for a large number of words $P_t(w)=P(w=t)$, the probability of w being of type t. This probability is referred to as the prior probability.

Figure 12:
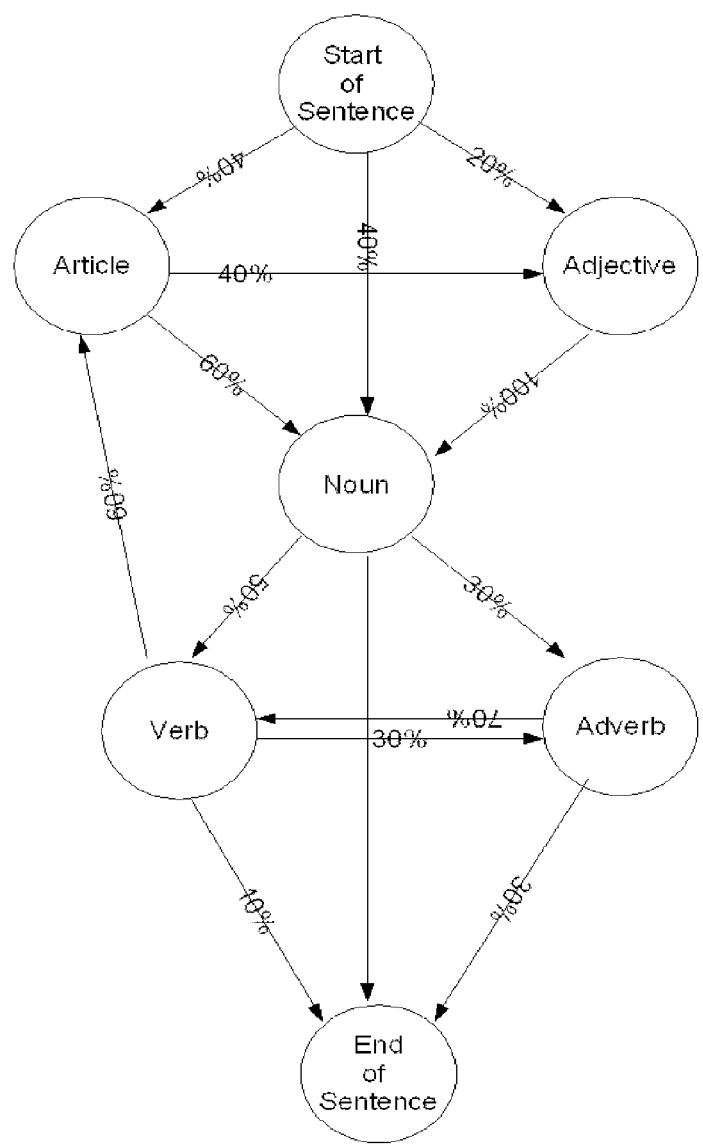
FIG. 12 illustrates an exemplary Hidden Markov Model providing transition probabilities indicating the probability that a certain part of speech follows another part of speech.

Referring to FIG. 12, a Hidden Markov Model HMM can be used to specify the probability $P(t \to u)$ of having a word $w_i$ of type t followed by a word $w_{i+1}$ of type u. A special value of u is the end-of-sentence marker. Thus, for every word type, the model also contains a probability that it is the last word in the sentence. In one aspect, the Hidden Markov Model can provide transition probabilities that indicate the probability that a certain part of speech follows another part of speech.

In a further aspect, the exemplary methodology can be followed to compute $P(S)=P(\{s_1, \ldots, s_n\})$.

Start with taking the prior probability for the first word:

$$P(\{s_1\})=P_{s1}(w_1) \quad (1)$$

For the following words $w_i$ look at the previous word $w_{i-1}$, and the two following words $w_{i+1}$ and $w_{i+2}$:

$$P(\{s_1, \cdots, s_i\}) = \quad (2)$$
$$P(\{s_1, \cdots, s_{i-1}\}) \times P(s_{i-1} \to s_i) \times \prod_{j=i+1}^{min(i+2,n)} [P_{s_j}(w_j) \times P(s_{j-1} \to s_j)]$$

To simplify computations the formula (2) above can be modified by replacing the multiplications by summations:

$$P(\{s_1, \cdots, s_i\}) = \qquad (3)$$
$$P(\{s_1, \cdots, s_{i-1}\}) \times P(s_{i-1} \to s_i) \times \sum_{j=i+1}^{min(i|2,n)} [P_{s_j}(w_j) \times P(s_{j-1} \to s_j)]$$

When the part of speech tag of a word is known, the normalized form of this word can be retrieved from the database. If the word cannot be found, the system will search for words that are know in the database but only match for the last part of the word. This enables the system to find combined words, which are often used in languages like Dutch or German. For example, if the word "autobanden" has to be normalized, the system can look for this word, and, if "autobanden" is not present the system can look for: "utobanden", "tobanden", "obanden" until it finds the term "banden," which is recognized and normalized into "band." Optionally, it can be concatenated with the prefix "auto" and the normalized word "autoband" is returned.

Returning to FIG. 10, the human expert can define stop words, which are defined herein as words that do not have a meaning but are used in natural languages to make the language readable. In a further aspect, the stop words can be removed from the normalized sentence at block 1004.

After removal of stop words, the system can identify terms by looking for each word in the sentence if the terms in the thesaurus contain the word at block 1005. The result is a list of potential terms assigned to each word. For example:

| assessment | efficacy | drug | treatment |
|---|---|---|---|
| T12312 | T12312 | T10012 | T19291 |
| T10012 | T10012 | T19291 | T87277 |
| T19291 | T83772 | T26637 | T83772 |
| T12921 | | T88371 | T00232 |
| T96290 | | | T03787 |

Optionally, the words can be clustered to see if they form a word. It is possible to have other words between the words that together form the term. The amount of words that can be present between the words that form the term can be defined by a sliding window. If all the words that are part of a term are found within the sliding window, the term is said to be identified. In the table above, terms "drug treatment assessment" can be identified (term T19291) and also "efficacy of treatment" (term T83772). In a further aspect of the invention, the sliding window defines how many words can be between words that form the term. For example, "in the North of Africa", the term "North Africa" can be identified if the sliding window is >0 because there is one word in between North and Africa.

The system can then identify concepts at block 1006. All identified terms can relate to one or more concepts. When only one concept is related to the term, this concept can be selected. If more concepts are related to this term, the generated context profile can be used to match with the context of the identified term at block 1007. The best matching concept can be determined as described in any method disclosed herein. In one aspect, the best matching concept can be the concept that has a context profile with the most overlap compared with the context of the term.

The knowledge profiles of different documents can be added up and averaged to generate a new knowledge profile based on a common concept amongst the various knowledge profiles. For example, the knowledge profiles of all documents of a single author can be added up and averaged, thus creating an expertise knowledge profile of that person. In another example, all of the expertise knowledge profiles of a group of persons are added up and averaged to create a knowledge profile of a company, research group or other functional or organizational entity. In one aspect, aggregated fingerprints can be compiled using the document knowledge profiles according to the Quadsum algorithm (as described below).

In one aspect, a document profile (i.e., the fingerprint) is a list of concepts with a weight. When it is determined that two documents belong to the same author, both document fingerprints can be examined. For example:

| Document A | Document B |
|---|---|
| concept1 100% | concept2 100% |
| concept2 50% | concept3 40% |
| concept4 20% | concept1 10% |

Merging these profiles will result in a knowledge profile with all of the concepts that occur in the document. As noted above, the weights can be calculated using the Quadsum Algorithm (as defined below).

$$w_c = w_c^2(A) + w_c^2(B)$$

concept1=100*100+10*10=10100;

concept2=50*50+100*100=12500;

concept3=0*0+40*40=1600; and concept4=20*20+0*0=400

The values can be normalized, resulting in values between 0% and 100%:

concept2=(12500/12500)*100=100%;

concept1=(10100/12500)*100=81%;

concept3=(1600/12500)*100=13%; and concept4=(400/12500)*100=3% ii. Concept Weighting

In one aspect of the invention, concepts that comprise a knowledge profile can be provided with weights that indicate their importance with regard to each other. The weights can represent, for example, the frequency with which the concepts occur in the textual information, the specificity of the concepts, statistical characteristics of each concept, and the like. Statistical characteristics of concepts can include, without limitation, the specificity, the sensitivity, the number of alternatives occurring in the textual information, the textual similarity, and the like. In one aspect, if a knowledge profile is to be displayed to a user, these weights can be used to determine which concepts from a knowledge profile are shown to the user.

Figure 13:
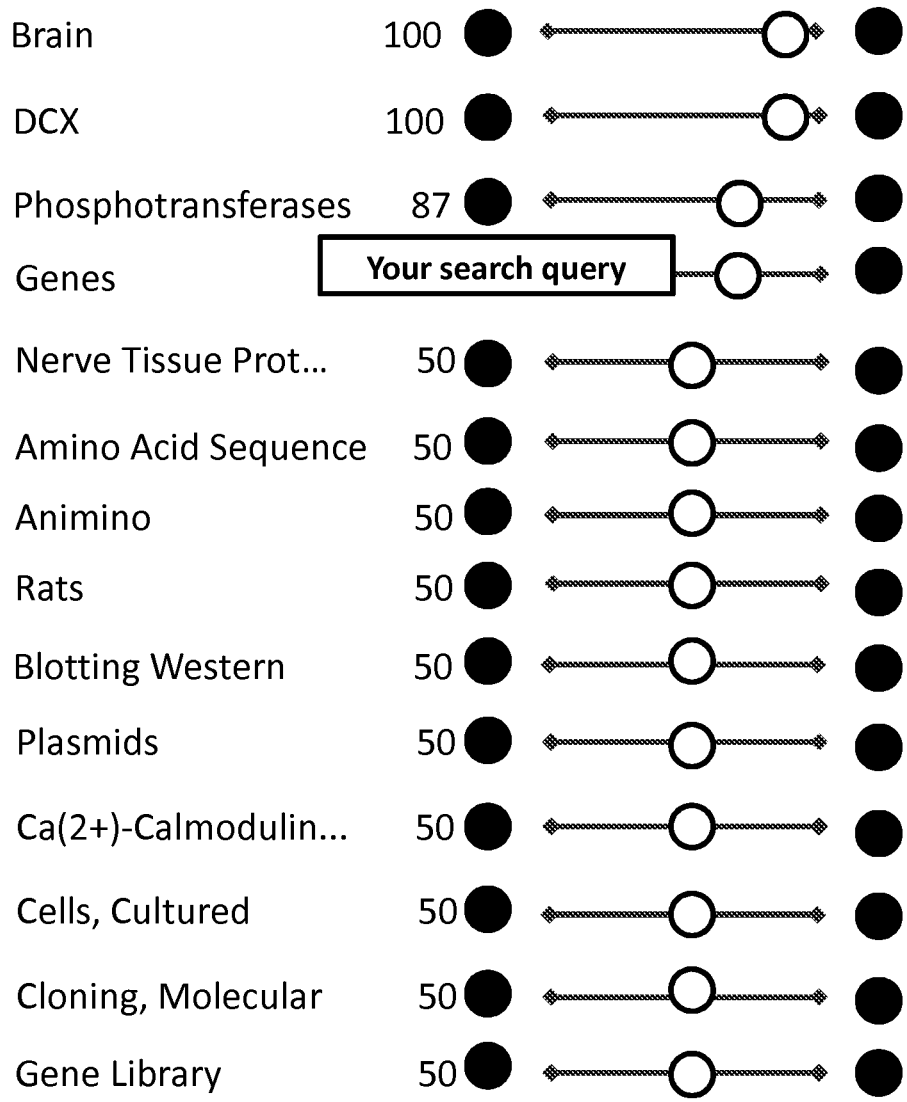
FIG. 13 illustrates an exemplary knowledge profile.

FIG. 13 is an example of a graphical presentation of an exemplary knowledge profile. In this example, the validated concepts each have a dot (slider) on a horizontal bar, indicating relative weights. The weights can be interactively adjusted by moving the slider to either side.

Figure 14:
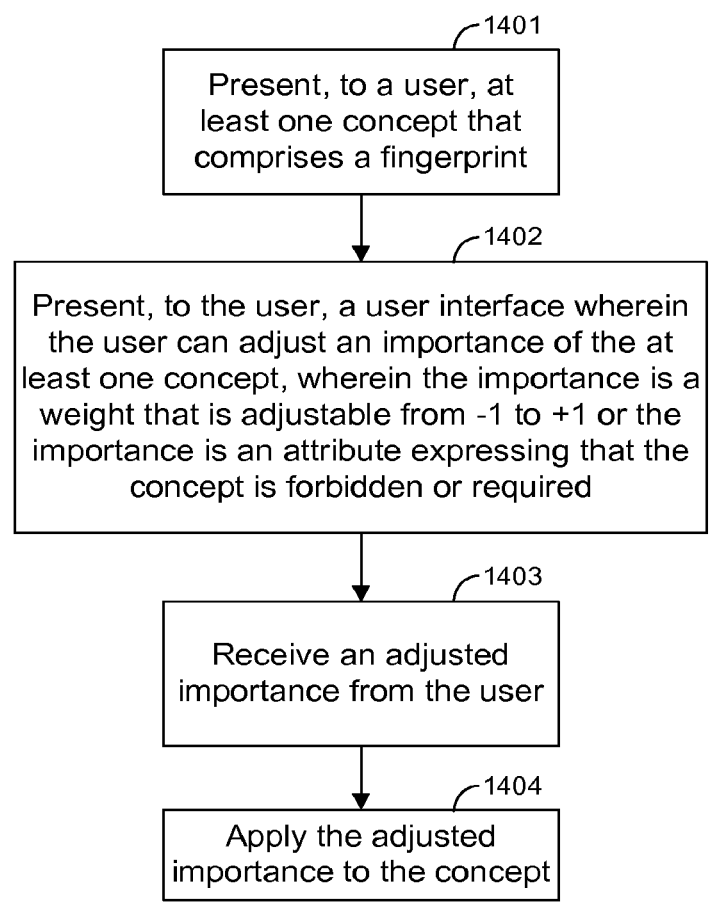
FIG. 14 illustrates an exemplary method for editing a fingerprint.

In another aspect, illustrated in FIG. 14, provided are methods for editing a fingerprint comprising a) presenting, to a user, a plurality of concepts that comprise a fingerprint at 1401; b) presenting, to the user, a user interface wherein the user can adjust an importance of at least one of the plurality of concepts, wherein the importance is a weight that is adjustable from −1 to +1 or the importance is an attribute expressing that the concept is forbidden or required at 1402; c) receiving an adjusted importance from the user at 1403; and d) applying the adjusted importance to the concept at 1404. In one aspect, presenting a plurality of concepts that comprise a fingerprint to a user can comprise displaying a list of concepts to the user on a display device.

In one aspect, the user interface can comprise a sliding scale wherein a user can drag a point along a line from −1 to +1. The user interface can comprise a plurality of inputs wherein each input is sequentially numbered from −1 to +1 and a user can select an input. In another aspect, the user interface can comprise a first and a second input wherein the first input corresponds to forbidding the concept and the second input corresponds to requiring the concept and a user can select one of the first or second inputs.

The methods can further comprise performing a search with the fingerprint that comprises using adjusted weights as a query. Optionally, the methods can further comprise performing a search with a concept that is required. Optionally, the methods can further comprise performing a search with a concept that is forbidden. It is also contemplated that the methods can further comprise performing a search with the fingerprint comprising adjusted weights as a query, with a concept that is required, with a concept that is forbidden, or any combination thereof.

For example, when many words in a given text all refer to a long list of concepts, but all these lists contain the same concept, then it is likely that that the same concept is described or meant in the text, and is therefore provided to the user. Additionally, when it appears that these words, which refer to the same concept, are in close proximity to each other in the text, the likelihood that that concept is described in the text increases even further. An example of this is a text in which the (English) term "black water fever" occurs. "Black" may for instance refer to the concepts "color," "race," but also to "malaria." Therefore, when in a text, both "black," "water," and "fever" occurs, it is very likely that the disease "malaria" is meant.

In a further aspect, the accuracy of a knowledge profile can be increased by adjusting the relative weights of a validated concept relative to the collection of knowledge profiles to be searched. For example, if a search takes place in a collection containing only knowledge profiles representing information relating to malaria, a concept such as "malaria" will not be specific enough to that catalog, and the weight of that concept in the input knowledge profile will be decreased.

Returning to FIG. 10, weight can be calculated for each concept that is identified at block 1008. There are various alternatives how to calculate the weight. In one aspect, the higher the weight of a concept, the more important this concept is in the text. The weight can vary, for example, between 0 and 1.

In one aspect, an exemplary method for determining a weight is to calculate the number of occurrences (frequency) of all concepts. For example, if concept A occurs five times in a document and concept B occurs three times in the document, the frequency of Concept A can be "normalized" to 100% ((5/5)*100%) and Concept B can be "normalized" to 60% ((3/5)*100%). The following equation can be used for normalization:

(frequency/maxfrequency)*100%.

Optionally, a square root can be applied to the frequency (to reduce the impact of concepts that have an extreme high frequency) and, in an optional additional step, a correction algorithm can be applied to this derived number. Exemplary correction algorithms are shown below in which T is defined as the total number of documents; S is defined as the frequency of a concept in all documents; Sum1 is the sum of all weights of all concepts in all documents; and Sum2 is the sum of all square root weights of all concepts in all documents. The exemplary correction algorithms include, for example and without limitation:

standard log 10(1+T/S);
correction1 (1/(S+1))exp, where exp is a user defined exponent;
correction2 log 10((T+1)/(S+1)); and
correction3 log(S+off) if S+off>1, 0.0001, otherwise off is a user defined exponent
widf 1/sum1 if sum>0, 0 otherwise All weights can be divided by the highest frequency to normalize this number between 0 and 1.

A correction algorithm can reduce the importance (weight) of concepts that occur in many documents. For example, if a medical corpus is indexed, a very generic term like "human" will not be very informative (most documents will contain this concept) while a specific gene like "BRCA2" is very specific. Therefore, if the frequency of the concept "human" in a document is higher than the frequency of the concept "BRCA2" the concept "BRCA2" would have higher weight after correction.

In another aspect, the accuracy of a knowledge profile can be further enhanced when a user, after presentation of the validated concepts with accompanying weights, interactively adjusts the weights. This weight adjustment can take place in various interactive ways. For example, spider's web diagrams can be used in which the various concepts are radially ranged around a common center point. In this aspect, by dragging a concept along a radial axis, the relative weight of a selected concept can be changed. In another weighting example, the concepts can be plotted on a bar chart, which enables the user to set the length of the various bars. In a further exemplary aspect, the user can store the list of concepts and weights locally for later use. In yet another example, a slider can be utilized to adjust the knowledge profile. The concepts found can be presented with a slider that allows for adjustment of the concept weights from, for example, 0 (not important) to 1 (very important). When used to create a category knowledge profile or search knowledge profile, the scale can be adjusted from −1 (no results desired that contain this concept) to 1 (prefer results that contain this concept). A concept can also be required (all the results must contain the concept) and forbidden (no results should be presented that contain this concept).

A category knowledge profile is similar to a search knowledge profile, except that the objective of a category profile is to select documents that belong to it, rather than find similar documents. In other words, the category knowledge profile will often contain additional concepts that will not be found together in one document but will define the category. For example, a "cancer category" will typically contain all known forms of cancer. It is not likely that there exists a document that will list all known forms of cancer and the search is not particular interested in finding it but rather the search is interested in finding all documents that have some relevancy.

In an additional aspect, the list of concepts found in a text together with the determined weights can form the knowledge profile, which is often referred to as a fingerprint, at block 1009 of FIG. 10. This knowledge profile represents the semantics of the text and can be used for many purposes, for example as a semantic representation of a document, to define a query, or as a category definition.

C. Searching with Knowledge Profiles

In one aspect, knowledge profiles can be stored as a record in a structured data file. This record can comprise additional meta data, such as, for example, title, location of data source, URL and other user defined meta data fields. The meta data fields can be defined as String or Integer and, optionally, an index for fast retrieval can be set.

In one aspect, with the help of the knowledge profile having weighted concepts, a user can search for similar knowledge profiles. This searching can take place interactively. In this aspect, the user can see the number of results and/or search results representing the knowledge sources of the search knowledge profiles and, by interactively changing the weight of the various concepts, the user can immediately sees the search results and/or the number of results change.

To enhance the precision of the search of large amounts of data, the search can be by metadata, such as, for example and not meant to be limiting, structured data like title, publication date, type of content, and the like. Optionally, the search can be by vector matching, which is based on words and/or based on concepts such as, for example, "find relevant document related to: user interfaces based on web architecture using AJAX". It is also contemplated that the method and system of the present invention can use both the metadata and vector matching approaches either substantially sequentially or substantially simultaneously to obtain highest precision and recall.

Figure 15:
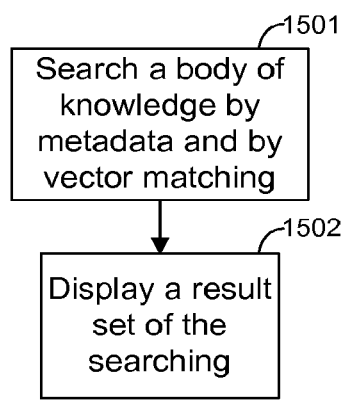
FIG. 15 illustrates an exemplary method for knowledge discovery.

In an aspect, illustrated in FIG. 15, provided are methods for knowledge discovery comprising searching a body of knowledge by metadata and by vector matching at 1501 and displaying a result set of the searching at 1502.

The body of knowledge can be a collection of fingerprints. Searching the body of knowledge by metadata can comprise performing a Boolean search. Searching the body of knowledge by metadata can comprise performing a search by determining a deviation of a metadata value from a specified value and expressing the deviation in a relevance score. Searching the body of knowledge by vector matching can comprise storing each fingerprint as a vector and performing a vector matching algorithm. Searching the body of knowledge by metadata and by vector matching can be performed simultaneously. Searching the body of knowledge by metadata and by vector matching can be performed sequentially. Displaying a result set of the searching can comprise displaying the result set on a display device.

Figure 16:
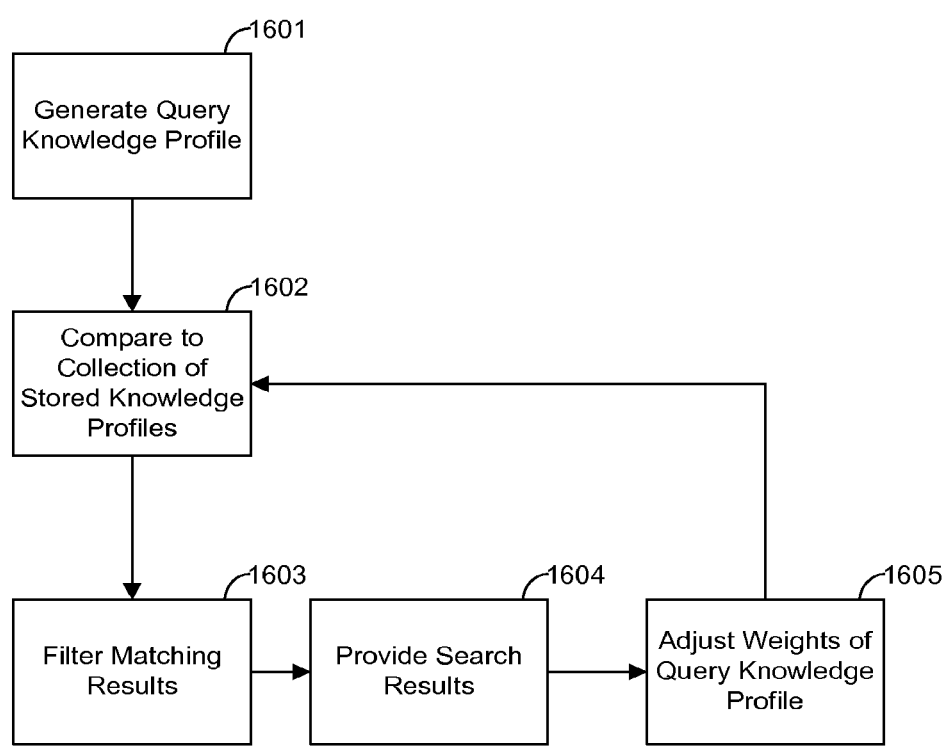
FIG. 16 illustrates an exemplary method for searching with knowledge profiles.

In one exemplary aspect, a knowledge profile can be used as a query to match with stored knowledge profiles. As illustrated in FIG. 16 and as provided herein, a query knowledge profile can be generated at block 1601. At block 1602, the query knowledge profile can be compared to a collection of stored knowledge profiles. In one exemplary aspect, a knowledge profile can be stored mathematically as a vector with values between 0 and 1. In this aspect, the matching of a query knowledge profile with a stored knowledge profile is accomplished via vector matching. As one skilled in the art will appreciate, a variety of algorithms known in the art can be used to calculate the distance between the vectors. In one example, the fingerprints can be viewed as vectors in an n-dimensional space, where n is the number of concepts in the thesaurus used. In this aspect, the vector coefficients denote the weights of the concepts present in the fingerprint and range from zero to one for document fingerprints (fingerprints in the collection) and from minus one to one for query fingerprints. All concepts that are not present in the fingerprint have coefficient of zero.

In one example, the standard inproduct of two vectors is used in most algorithms and can be defined as:

$$m(f, q) = \sum_{c=1}^{n} f_c q_c$$

where $f_c$ denotes the weight of concept c in fingerprint f. A vector f is used as a fingerprint from a collection; a vector q is used as the query fingerprint used to find matches in one or more collections.

To accommodate query vectors q containing negative weights, some algorithms use the query vector coefficients in a special way, using either the sign of the weight, or its absolute value. The notation of these two functions as used in the formulae is as follows:

$$|q_c| = \begin{cases} -q_c & q_c < 0 \\ q_c & q_c \geq 0 \end{cases}$$

$$\Delta q_c = \begin{cases} -1 & q_c < 0 \\ 1 & q_c \geq 0 \end{cases}$$

In a further aspect, the various algorithms for determining the distance between vectors can comprise, but are not limited to, Vector algorithm, Portal algorithm, Collexis algorithm, Quadsum algorithm, Jaccard algorithm, Dice algorithm, Basic algorithm, Weighted algorithm, Orion algorithm, Weighted Overlap algorithm, and the like. It is contemplated that one or more of these algorithms can be used concurrently.

In one example, the Vector algorithm, described with the formula below, is used to match the query fingerprint with the stored fingerprints if the number of concepts is important. When all fingerprints in a collection have about the same number of concepts, this algorithm can provide acceptable results. Resulting values are $\in[-1,1]$.

$$\frac{m(f, q)}{\sqrt{m(f, f)m(q, q)}} = \frac{\sum_{c=1}^{n} f_c q_c}{\sqrt{\Sigma f_c f_c \Sigma q_c q_c}}$$

In another example, the Portal algorithm can also be used to match fingerprints. As shown in the formula below, where $\delta_{\Delta q}$ is a vector with 1's for the concepts in q with positive weights, −1's for the concepts in q with negative weights, and zeroes for the concepts that are missing in q. With this formula, all document fingerprints are selected that contain a concept that also is present (with a positive weight) in the query fingerprint. Ranks of documents that additionally contain concepts with a negative weight in the query fingerprint are decreased. The Portal algorithm ignores the length of the vector and gives great performance when it is desired to select document fingerprints that contain specified concepts (and possibly not others). Thus, in one example, this particular methodology is suitable for the creation of portal applications. Resulting values are $\in <-\infty,+\infty>$.

$$m(f, \delta_{\Delta q}) = \sum_{c \in q} f_c \Delta q_c$$

In a further example, the Collexis algorithm can also be used to match the query fingerprint with the stored fingerprints, where $s_f$ is the vector of specificities of the concepts present in fingerprint f. Here, if a concept is very common in a collection (this means it is less specific), it is of less importance to the result compared to concepts that are very specific. For example, if a database with documents about a specific concept is indexed, most document fingerprints will contain that concept. In such a situation, the Collexis algorithm will almost ignore that specific concept while fingerprint matching. The resulting values are $\in <-\infty,+\infty>$.

$$m\left(\frac{1}{sf}, \delta_{\Delta q}\right) = \sum_{c \in q} \frac{\Delta q}{s_{f_c}}$$

In another example, the Quadsum algorithm shown below can also be used for fingerprint matching. In the Quadsum algorithm, all concepts in the query fingerprint q that are also in fingerprint f are squared and summed. By using the square of the vector, all concepts that have a higher weight are of more importance to the ranking of the results compared to those concepts with a lower weight. This methodology is preferably used for aggregating fingerprints. The resulting values are $\in <-\infty,+\infty>$.

$$m(q\delta_f, |q|\delta_f)^2 = \sum_{c \in f \cap q} q_c |q_c|$$

The exemplary Jaccard algorithm, described with the formula below, can also be used to compare fingerprints. The Jaccard algorithm is based on the vector algorithm and deals with the problem of fingerprints with different lengths. In one aspect, the Jaccard algorithm can be used when document fingerprints have a significant different number of concepts. The resulting values are $\in [-1,1]$.

$$\frac{m(f,q)}{m(f,f) + m(q,q) - m(f,q)} = \frac{\sum_{c=1}^{n} f_c q_c}{\Sigma f_c f_c + \Sigma q_c q_c - \Sigma f_c q_c}$$

Still further, the Dice algorithm, described with the formula below, can also be used to match the query fingerprint with the stored fingerprints where fingerprints have different lengths. This algorithm solves the same problem as the Jaccard algorithm, but with a different approach. The resulting values are $\in [-1,1]$.

$$\frac{2m(f,q)}{m(f,f) + m(q,q)} = \frac{2\sum_{c=1}^{n} f_c q_c}{\Sigma f_c f_c + \Sigma q_c q_c}$$

The Basic algorithm, described with the formula below, can also be used for vector matching. In this methodology, the length of the vector is completely ignored and can thus be preferably used when the number of concepts in document fingerprints has a great variety, such as, for example, when some document fingerprints contain 3 concepts and others contain 30 fingerprints. The resulting values are $\in <-\infty,+\infty>$.

$$m(f, q) = \sum_{c=1}^{n} f_c q_c$$

In another example, the Weighted algorithm, described with the formula below, can be used to match the query fingerprint with the stored fingerprints. In the Weighted algorithm, $m_f$=number of matched concepts off, $l_q$ is the number of concepts in q, and O is a correction value given in a registry key. The resulting values are $\in <-\infty,+\infty>$.

$$\frac{m_f + O}{l_q + O} m(f, q) = \frac{m_f + O}{l_q + O} \sum_{c=1}^{n} f_c q_c$$

The Orion algorithm can be used to match the query fingerprint with the stored fingerprints. This algorithm described with the formula below, ignores the length of the vector completely and is typically used when the number of concepts in document fingerprints has a great variety (for instance when some document fingerprints contain 3 concepts and others contain 30 fingerprints). An Orion algorithm is generally a modified basic algorithm in which a correction term is added that is larger the more the concepts (with positive query-weight) overlap. H is a weighting factor given by a human expert. The resulting values are $\in <-\infty,+\infty>$.

$$m(f, q) + \frac{H}{100} m(\Delta q \delta_f, \Delta q \delta_f) = \sum_{c=1}^{n} f_c q_c + \frac{H}{100} \sum_{c \in f \cap q} \Delta q_c$$

The Weighted Overlap algorithm can be used for vector matching. In this exemplary methodology, $m_f$ is given by the formula below and $l_q$=the number of concepts of q.

$$\frac{xm(f,q) + (1-x)m_f m(q, \Delta q)}{1 - y + y(xm(\Delta q, q) + (1-x)l_q m(q, \Delta q))}$$

The algorithm combines some properties of the Weighted and Basic algorithms discussed above. The Weighted Overlap algorithm essentially consists of two parts: a part that resembles the basic algorithm and computes the overlap in terms of the weights, and a part that computes the overlap by counting the overlapping terms. The resulting values are $\in <-\infty,+\infty>$ or $[-1,1]$, depending on the value of y.

The parameter x controls the relative importance of these two parts of the formula. It can be defined by a human expert with x=1: the basic algorithm, but then possibly normalized (see the meaning of parameter y below); x=0: pure overlap counting (no usage of weights whatsoever); or x=0.5: a mix between overlap counting and use of weights. Using this 0.5 as the value of x, a special property of this formula is that the number of overlapping concepts is the major determining factor, while the concept ranks have a minor role. Thus, documents with a particular number of overlapping concepts are never listed below documents that have a smaller number of overlapping concepts in a sorted result list. In case of two documents with an equal number of overlapping concepts, the respective ranks are taken into account. The second parameter y controls whether the results should be normalized or not. In one example, if it can be specified by a human expert with y=1, the resulting rank is normalized, i.e., $\in[-1,1]$, or if y=0: the resulting rank is not normalized, i.e., $\in<-\infty,+\infty>$.

Returning to FIG. 16, vector matching provides matching results. In another aspect, matching results can be provided by a Boolean search. In another aspect, matching results can be provided by determining a deviation of a metadata value from a specified value and expressing the deviation in a relevance score. In another aspect, matching results can be provided by a combination of vector matching and metadata searching Optionally, these matching results can be filtered using available meta data at block 1603. In another aspect, operations can include results that contain meta data that match a given value, or contain a value that is more or less than a specific value. It is also contemplated that Boolean operations like OR and AND can be allowed, which makes it possible to match knowledge profiles with each other with a restriction. For example: all results must be published between 1999 and 2002 or after 2005.

After filtering, a user can be provided with the search results that represent the fingerprints that most closely match the query fingerprint at block 1604.

The accuracy of a knowledge profile can be increased by adjusting the relative weights of a concept relative to the collection of knowledge profiles searched, or to be searched, at block 1605. With the help of the knowledge profile having weighted concepts, a user can tailor the search results. After the user adjusts the weights at block 1605, the system can repeat from block 1602, until the user is satisfied with the search results. This searching can take place interactively. In this aspect, the user can see the number of results and/or search results representing the knowledge sources of the search knowledge profiles and, by interactively changing the weight of the various concepts, the user can immediately see the search results and/or the number of results changed.

For example, if a search takes place in a collection containing only knowledge profiles representing information relating to malaria, a concept such as "malaria" will not be specific enough to that collection, and the weight of that concept in the input knowledge profile will be decreased. The value of other concepts can be increased when the concept is very relevant to the query. Concepts can also be made required (meaning that the results should always contain that concept) or forbidden (meaning that the results will not contain that concept). FIG. 13 shows an example of an application with sliders.

In a further aspect, the system can provide the user with concepts that are semantically related to the query but not part of the query. These so called proposed concepts are generated using the results of the query itself. When the query has been posted and the results are retrieved, the system will analyze the knowledge profiles of these results. All these knowledge profiles are accumulated and the top n (e.g., top 100) concepts (without the concepts that are part of the query) are proposed to the user. These proposed concepts are organized in semantic groups (defined in the thesaurus like "diseases," "chemicals & drugs," "anatomy," etc . . . ). The user can select one or more of these proposed concepts, examples of which are shown in FIG. 17, in order to add the concept to the query and refining the results.

Figure 18:
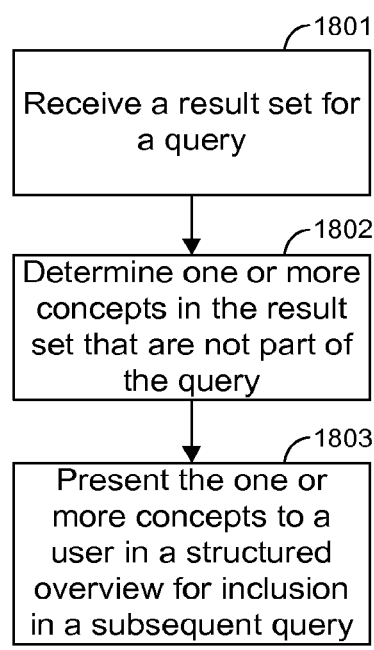
FIG. 18 illustrates an exemplary method for knowledge discovery.

In one aspect, illustrated in FIG. 18, provided are methods for knowledge discovery comprising receiving a result set for a query at 1801, determining one or more concepts in the result set that are not part of the query at 1802, and presenting the one or more concepts to a user in a structured overview for inclusion in a subsequent query at 1803.

The methods can further comprise performing a search with the query. Presenting the one or more concepts to the user comprises displaying the one or more concepts on a display device. The structured overview is a grouping of concepts according to a terminology system (TS). The grouping can utilize a hierarchy defined in the TS. The grouping can utilize semantic types defined in the TS.

Presenting the one or more concepts to the user comprises permitting the user to select any of the one or more concepts to add to the subsequent query. The methods can further comprise performing the subsequent query. The methods can further comprise repeating 1801-1803 after performing the subsequent query.

Optionally, the query expansion can also be accomplished by exploiting the thesaurus to expand the query knowledge profile with child concepts of a recognized concept. After generating the query knowledge profile, it can be enhanced by adding the children of each concept in the hierarchy of the thesaurus to the query knowledge profile. For example, the concept "Africa" in a query knowledge profile can be expanded with all the individual countries in this continent because the terminology system organizes these countries in a hierarchical sublevel of the continent. A subsequent match of the query with the target document collection will now also qualify documents that do not have the concept "Africa," but do have the concept "Ivory Coast", which enhances the overall quality of the result set.

Figure 19:
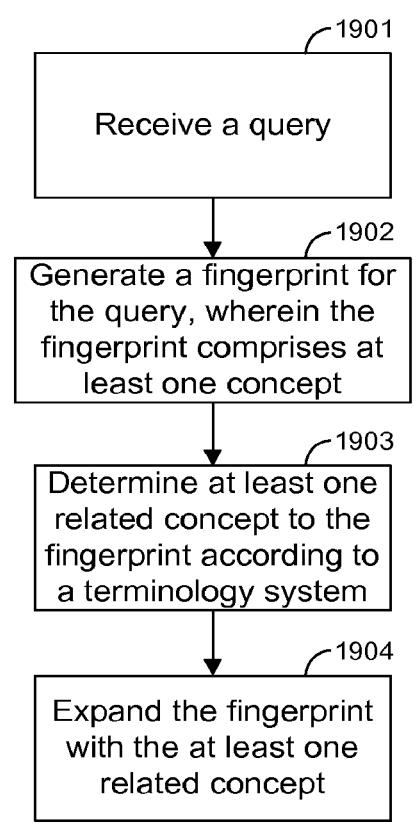
FIG. 19 illustrates another exemplary method for knowledge discovery.

In another aspect, illustrated in FIG. 19, provided are methods for knowledge discovery comprising: receiving a query at 1901; generating a fingerprint for the query, wherein the fingerprint comprises at least one concept at 1902; determining at least one related concept to the fingerprint according to a terminology system at 1903; and expanding the fingerprint with the at least one related concept at 1904.

In one aspect, the query can be a document. In another aspect, the fingerprint can be a list of concepts and their associated relevance weights. In one exemplary aspect, the terminology system can be a thesaurus. Expanding the query can comprise adding the at least one related concept to the query. The methods can further comprise querying a knowledge querying a knowledge base with the expanded query.

In another aspect, the potential relationships between concepts that have never been mentioned together in the same document, which therefore have no co-occurrence, can be predicted by using generated knowledge profiles. These predicted relationships can be achieved by creating a context fingerprint of each concept present within a terminology system of a specific domain. As used herein, a context fingerprint can be defined as a list of concepts and their associated relevance weight, which is constructed based on co-occurrence of concepts in the indexed documents with the concept the context fingerprint is created for. Having a context fingerprint for each concept enables the calculation of the distance between these concepts even when these concepts themselves do not co-occur in one document. The distance can be calculated using one of the matching algorithms described above. When the determined distance is small, both concepts have a lot of context concepts in common. In this aspect, the concepts that do not have co-occurrence in a cataloged corpus of documents but have a high degree of overlap of context concepts can have a potential relationship.

Figure 20:
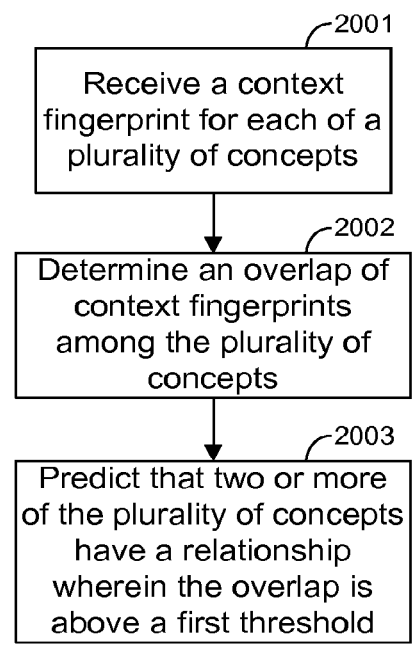
FIG. 20 illustrates an exemplary method for predicting a potential relationship between concepts without a co-occurrence.

In one aspect, illustrated in FIG. 20, provided are methods for predicting a potential relationship between concepts without a co-occurrence comprising: receiving a context fingerprint for each of a plurality of concepts at 2001; determining an overlap of context fingerprints among the plurality of concepts at 2002; and predicting that two or more of the plurality of concepts have a relationship wherein the overlap is above a first threshold at 2003.

Figure 21:
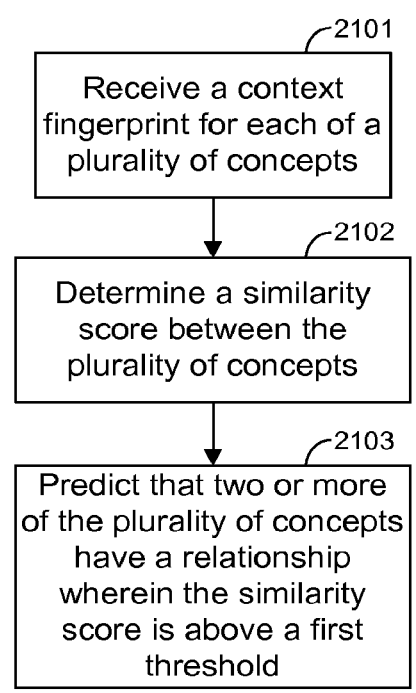
FIG. 21 illustrates another exemplary method for predicting a potential relationship between concepts without a co-occurrence.

In another aspect, illustrated in FIG. 21, provided are methods for predicting a potential relationship between concepts without a co-occurrence comprising: receiving a context fingerprint for each of a plurality of concepts at 2101; determining a similarity score between the plurality of concepts at 2102; and predicting that two or more of the plurality of concepts have a relationship wherein the similarity score is above a first threshold at 2103.

Figure 22:
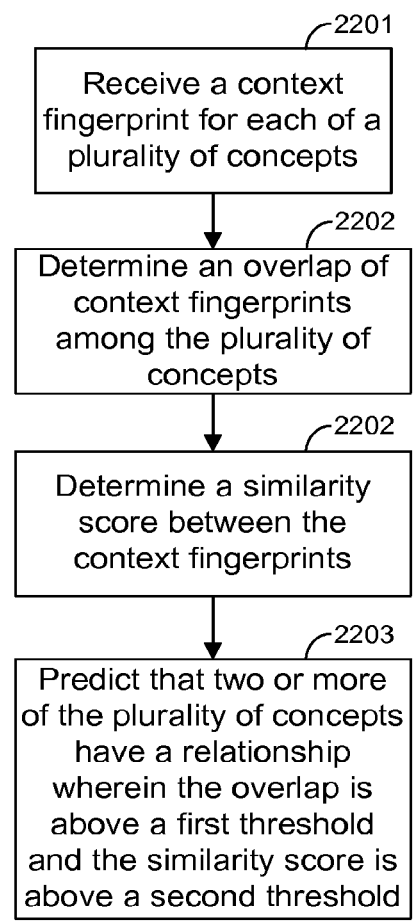
FIG. 22 illustrates another exemplary method for predicting a potential relationship between concepts without a co-occurrence.

In a further aspect, illustrated in FIG. 22, provided are methods for predicting a potential relationship between concepts without a co-occurrence comprising: receiving a context fingerprint for each of a plurality of concepts at 2201; determining an overlap of context fingerprints among the plurality of concepts at 2202; determining a similarity score between the plurality of concepts at 2203; and predicting that two or more of the plurality of concepts have a relationship wherein the overlap is above a first threshold and the similarity score is above a second threshold at 2204.

For example, the plurality of concepts does not co-occur in a plurality of documents. In another example, the plurality of concepts does not co-occur within the same sentence of a single document. In another example, the plurality of concepts does not co-occur within the same paragraph of a single document.

A context fingerprint can be a list of concepts and their associated relevance weights, which is constructed based on co-occurrence of concepts in documents with the concept the context fingerprint is created for.

Determining an overlap of context fingerprints among the plurality of concepts can comprise determining a number of concepts the two context fingerprints have in common. Determining a similarity score between the pluralities of concepts can comprise performing a matching algorithm. Performing a matching algorithm can comprise storing each context fingerprint as a vector and performing a vector matching algorithm.

IV. Exemplary Applications

A. Knowledge Network

Figure 23:
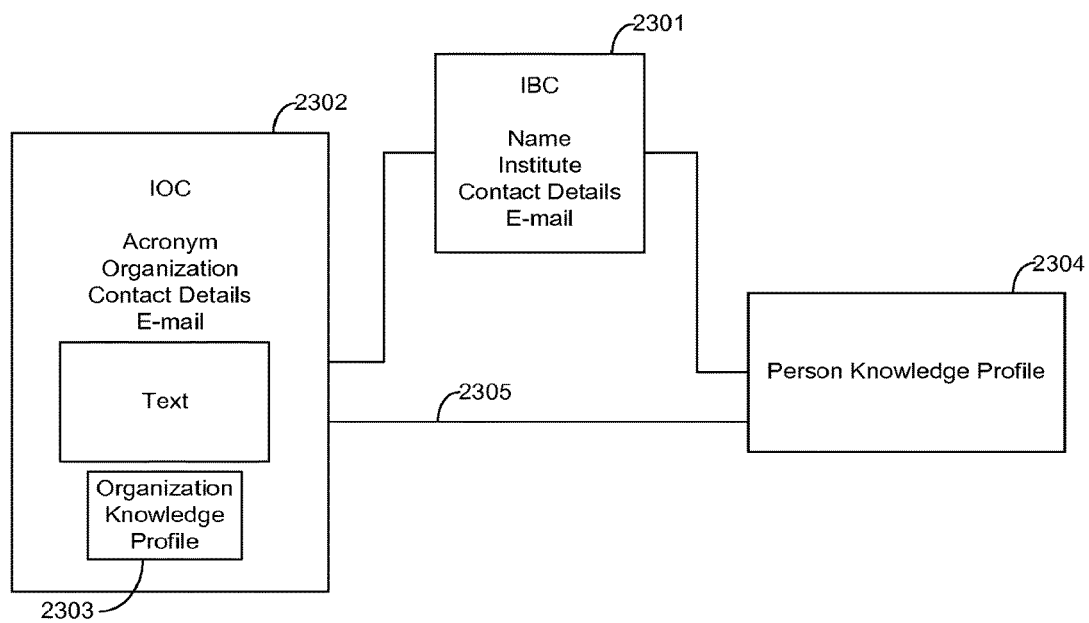
FIG. 23 illustrates information types useful for constructing a knowledge network and the interrelations between the various information types.
Figure 24:
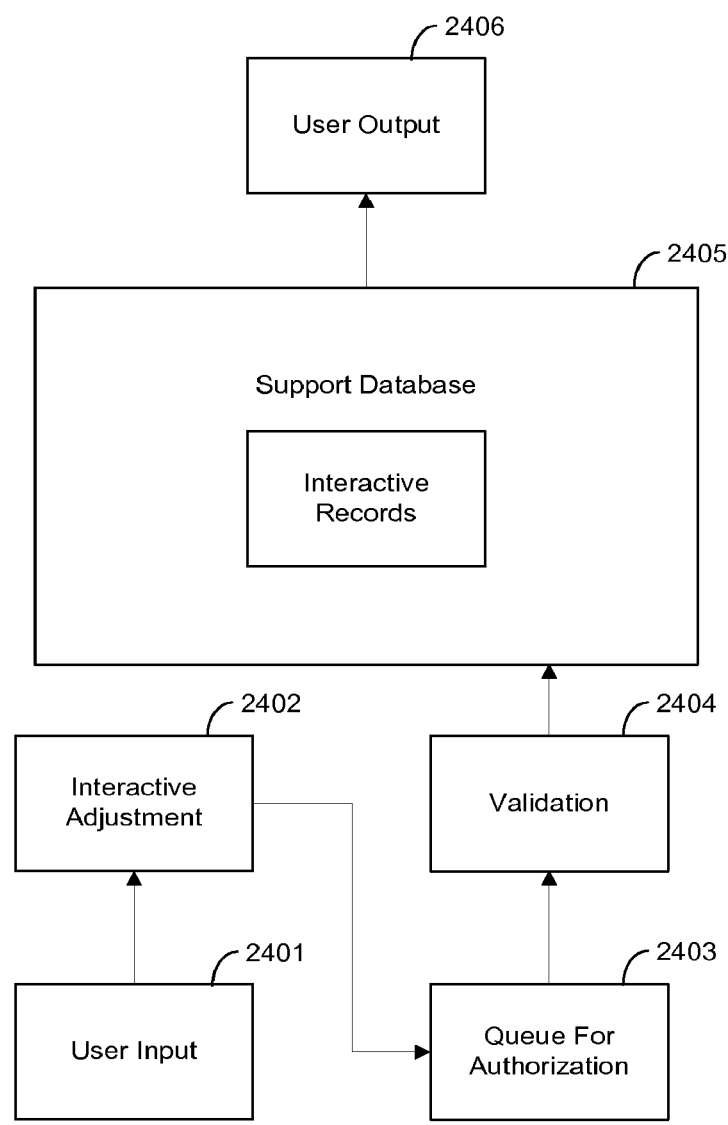
FIG. 24 illustrates an exemplary method for generating a knowledge profile; building up and maintaining a knowledge network.

An exemplary application of the methods and systems provided herein is the development, maintenance and build-up of knowledge and interest networks of persons within organizations, of organization-to-organization and/or person-to-person as illustrated in FIG. 23 and FIG. 24. To build up and maintain such a network, knowledge profiles reflecting interests of persons and organizations can be generated and associated with each other. Based on a knowledge profile derived from text a list can be generated on the fly with experts that have matching expertise knowledge profiles or interest knowledge profiles. In one aspect, these associations are not stored on the system but can be generated on the fly.

FIG. 23 illustrates information types useful for such an application and the interrelations between the various information types. For example, the information types can comprise data associated with persons 2301 such as name, employer organization, contact information such as an E-mail address, and the like. Information types can also comprise, data associated with an organization 2302, such as contact data, and a knowledge profile 2303 representing the organizational interests. Additionally, a knowledge profile 2304 representing the interest of the person can be generated. Associations 2305 can be established amongst the various knowledge profiles. The association of organization knowledge profiles 2303 with personal interest knowledge profiles 2304 can result in a knowledge and interest network.

FIG. 24 is an exemplary method for building up and maintaining a knowledge network. A user can enter textual information relating to the expertise of a person, which can be the user, at block 2401. Examples of textual information include, but are not limited to, articles/reports authored by the person, descriptions or lists of the person's interests, and the like. The textual information can be used to generate a knowledge profile representing the person. The user can adjust the profile interactively at block 2402. The profile can be queued for authorization at block 2403. An authorization unit, either being an automated system or a person, can check the textual information and the profile for completeness and carry out a validation at block 2404, before entering the data and the profile in a datafile, for example a database 2405. Once entered into the database 2405, the user can receive a confirmation message at block 2406.

B. Identifying Experts from a Document Repository

As described earlier, the knowledge profiles of different documents can be added up and averaged to generate a new knowledge profile based on a common concept amongst the various knowledge profiles. The corresponding multi-document profile (or "expert profile") of compiled individual document profiles has several applications. In one example, a common concept, or defined piece of metadata, amongst a set of two or more documents is an author. Therefore, a knowledge profile (referred to as an expert profile) of that author's work in a defined field can be created.

Figure 25:
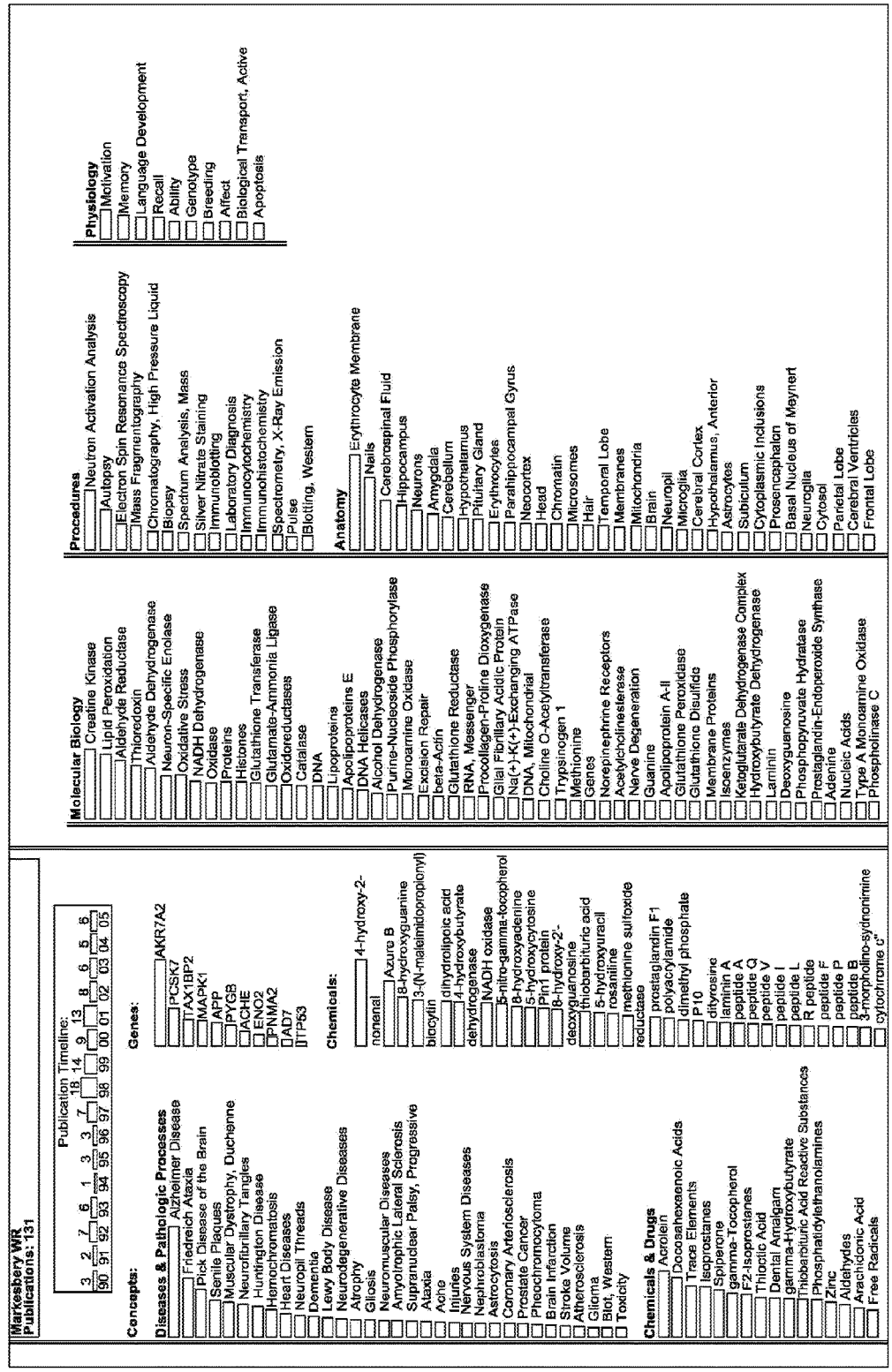
FIG. 25 illustrates an exemplary expert profile.

An example of such an expert profile is illustrated in FIG. 25. In this figure, the output of the compiled fingerprints of 131 different publication abstracts for a researcher with publications in the field of Alzheimer's disease.

In utilizing sources of text, which can be compiled and associated with an author, this application allows for the automated creation of expert profiles with limited or no input from a user, by automating updated associated text sources as they are entered and reviewed in the repository.

In one aspect, an expert profile can be used to search for experts across a document repository. For example, if expert profiles are created for multiple authors, using the approach outlined above, than a saved repository of expert profiles can be created—where said expert profiles are the compiled profiles of their associated documents. These expert profiles can be searched utilizing the methods and systems provided herein.

Figure 26:
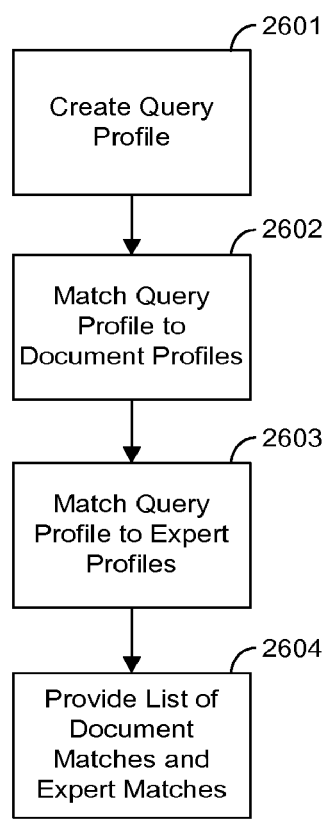
FIG. 26 illustrates an exemplary method for finding an expert.

FIG. 26 illustrates an exemplary method for locating an expert and for locating documents relevant to a search. Assume that a researcher is completing a search, using the methods and systems provided herein, against a document repository and a defined expert repository created as explained above by compiling documents with the same associated author. The goal of the search is to find relevant documents for comparison on approach/findings and relevant experts based on their cumulative research text.

At block 2601, a user can provide the system with a query and a query profile can be generated for the query. At block 2602, the query profile can be used to match with the most relevant or highly matching knowledge profile or profiles from the document repository. At block 2603, the knowledge profile can also be matched against expert profiles in the expert repository.

At block 2604, the user can be provided with not only matched and sorted documents of relevance, but also with matched and sorted experts of relevance based on the same matching approach, except that this match is against the expert profile—a compilation of individual document profiles—instead of a match of one query profile against one document profile.

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for conducting non-keyword based searching by utilizing an electronic concept base that results in improved electronic search results, the method comprising:
   plotting, by a processing device, a set of concepts derived from a selected set of fingerprints on a terminology system, wherein:
   the plotting generates a map, and
   the set of concepts are obtained from the electronic concept base used for the non-keyword based searching;
   selecting, by the processing device, a single concept from the set of concepts;
   determining, by the processing device, a relative importance of the selected single concept by applying a correction algorithm selected from at least one of:

$\log 10(1+T/S)$, $(1/(S+1))\exp$, $\log 10((T+1)/(S+1))$, and $\log(S+\text{off})$, wherein T is a total number of documents, S is a frequency of the at least one concept in all documents, and S+off>1, 0.0001 or off is a user defined exponent;
   displaying, by the processing device, the map with the set of concepts and the selected single concept;
   indicating, by the processing device, the relative importance of the selected single concept with respect to the set of concepts on the map; and
   conducting the non-keyword based searching by weighting the selected single concept based on the determined relative importance of the selected single concept such that search results that are generated as a result of the non-keyword based searching reflect the weighted selected single concept.

2. The method of claim 1, wherein each fingerprint represents a document.

3. The method of claim 1, wherein each fingerprint represents a person.

4. The method of claim 1, wherein each fingerprint represents an organization.

5. The method of claim 1, wherein indicating the relative importance of the selected single concept comprises displaying the selected single concept on the map in a first color and a remaining one or more concepts from the set of concepts in a second color that is different from the first color.

6. The method of claim 1, wherein indicating the relative importance of the selected single concept comprises displaying the selected single concept on the map with a first object and a remaining one or more concepts from the set of concepts with a second object, wherein the first object is larger than the second object.

7. A system for conducting non-keyword based searching by utilizing an electronic concept base that results in improved electronic search results, the system comprising:
   a processing device; and
   a non-transitory, processor-readable storage medium, the non-transitory, processor-readable storage medium comprising one or more programming instructions that, when executed, cause the processing device to:
   plot a set of concepts derived from a selected set of fingerprints on a terminology system, wherein:
   the plotting generates a map, and
   the set of concepts are obtained from the electronic concept base used for the non-keyword based searching;
   select a single concept from the set of concepts;
   determine a relative importance of the selected single concept by applying a correction algorithm selected from at least one of:

$\log 10(1+T/S)$, $(1/(S+1))\exp$, $\log 10((T+1)/(S+1))$, and $\log(S+\text{off})$, wherein T is a total number of documents, S is a frequency of the at least one concept in all documents, and S+off>1, 0.0001 or off is a user defined exponent;
   display the map with the set of concepts and the selected single concept;
   indicate the relative importance of the selected single concept with respect to the set of concepts on the map; and
   conduct the non-keyword based searching by weighting the selected single concept based on the determined relative importance of the selected single concept such that search results that are generated as a result of the non-keyword based searching reflect the weighted selected single concept.

8. The system of claim 7, wherein each fingerprint represents a document.

9. The system of claim 7, wherein each fingerprint represents a person.

10. The system of claim 7, wherein each fingerprint represents an organization.

11. The system of claim 7, wherein the one or more programming instructions that, when executed, cause the processing device to indicate the relative importance of the selected single concept further cause the processing device to display the selected single concept on the map in a first color and a remaining one or more concepts from the set of concepts in a second color that is different from the first color.

12. The system of claim 7, wherein the one or more programming instructions that, when executed, cause the processing device to indicate the relative importance of the selected single concept further cause the processing device to display the selected single concept on the map with a first object and a remaining one or more concepts from the set of concepts with a second object, wherein the first object is larger than the second object.

13. A non-transitory, processor-readable storage medium with computer executable instructions embodied thereon conducting non-keyword based searching by utilizing an electronic concept base that results in improved electronic search results, the computer executable instructions directing a processing device to:

plot a set of concepts derived from a selected set of fingerprints on a terminology system, wherein:
the plotting generates a map, and
the set of concepts are obtained from the electronic concept base used for the non-keyword based searching;

select a single concept from the set of concepts;

determine a relative importance of the selected single concept by applying a correction algorithm selected from at least one of:

$\log 10(1+T/S)$, $(1/(S+1))\exp$, $\log 10((T+1)/(S+1))$, and $\log(S+\text{off})$, wherein T is a total number of documents, S is a frequency of the at least one concept in all documents, and S+off>1, 0.0001 or off is a user defined exponent;

display the map with the set of concepts and the selected single concept;

indicate the relative importance of the selected single concept with respect to the set of concepts on the map; and conduct the non-keyword based searching by weighting the selected single concept based on the determined relative importance of the selected single concept such that search results that are generated as a result of the non-keyword based searching reflect the weighted selected single concept.

14. The computer readable medium of claim 13, wherein each fingerprint represents a document.

15. The computer readable medium of claim 13, wherein each fingerprint represents a person.

16. The computer readable medium of claim 13, wherein each fingerprint represents an organization.

17. The computer readable medium of claim 13, wherein the computer executable instructions directing the processing device to indicate the relative importance of the selected single concept further direct the processing device to indicate the relative importance of the selected single concept further cause the processing device to display the selected single concept on the map in a first color and a remaining one or more concepts from the set of concepts in a second color that is different from the first color.

18. The computer readable medium readable medium of claim 13, wherein the computer executable instructions directing the processing device to indicate the relative importance of the selected single concept further direct the processing device to indicate the relative importance of the selected single concept further cause the processing device to display the selected single concept on the map with a first object and a remaining one or more concepts from the set of concepts with a second object, wherein the first object is larger than the second object.

* * * * *

UNITED STATES PATENT AND TRADEMARK OFFICE
CERTIFICATE OF CORRECTION

PATENT NO. : 9,971,974 B2
APPLICATION NO. : 15/247303
DATED : May 15, 2018
INVENTOR(S) : Edwin Adriaansen et al.

Page 1 of 1

It is certified that error appears in the above-identified patent and that said Letters Patent is hereby corrected as shown below:

In the Claims

Column 28, Line 33, Claim 18 change "The computer readable medium readable medium of claim 13," to "The computer readable medium of claim 13,"

Signed and Sealed this
Seventeenth Day of July, 2018

Andrei Iancu
*Director of the United States Patent and Trademark Office*